United States Patent [19]
McClure et al.

[11] Patent Number: 5,866,219
[45] Date of Patent: Feb. 2, 1999

[54] PRODUCT INFORMATION LABEL SYSTEM

[75] Inventors: Paul McClure, Princeton; Dennis J. Tursso, Sunfish Lake; Bill Weernink, Savage; James R. Meineke, Mahtomedi, all of Minn.

[73] Assignee: Product Engineering, Inc., St. Paul, Minn.

[21] Appl. No.: 740,479

[22] Filed: Oct. 30, 1996

[51] Int. Cl.[6] .................................................. B42D 15/00
[52] U.S. Cl. .............................. 428/40.1; 281/2; 281/5; 283/81; 428/41.7; 428/41.8; 428/42.2; 428/192; 428/194
[58] Field of Search ............................ 428/40.1, 41.7, 428/41.8, 42.2, 192, 194; 283/81; 281/2, 5

[56] References Cited

U.S. PATENT DOCUMENTS

| | | | |
|---|---|---|---|
| Re. 34,366 | 9/1993 | Instance | 40/299 |
| 3,625,547 | 12/1971 | Burke | 283/21 |
| 3,869,328 | 3/1975 | Instance | 156/285 |
| 4,007,824 | 2/1977 | Reist | 221/22 |
| 4,323,608 | 4/1982 | Denny et al. | 428/43 |
| 4,425,181 | 1/1984 | Bahr et al. | 156/497 |
| 4,479,838 | 10/1984 | Dunsirn et al. | 156/247 |
| 4,488,922 | 12/1984 | Instance | 156/192 |
| 4,504,348 | 3/1985 | Instance | 156/251 |
| 4,560,432 | 12/1985 | Instance | 156/459 |
| 4,583,765 | 4/1986 | Messinger | 283/81 |
| 4,592,572 | 6/1986 | Instance | 281/2 |
| 4,637,633 | 1/1987 | Instance | 283/81 |
| 4,675,062 | 6/1987 | Instance | 156/227 |
| 4,680,080 | 7/1987 | Instance | 156/357 |
| 4,699,833 | 10/1987 | Instance | 428/42 |
| 4,708,368 | 11/1987 | Instance | 283/81 |
| 4,711,686 | 12/1987 | Instance | 156/227 |
| 4,726,972 | 2/1988 | Instance | 428/40 |
| 4,744,161 | 5/1988 | Instance | 40/299 |
| 4,744,591 | 5/1988 | Instance | 281/5 |
| 4,747,618 | 5/1988 | Instance | 281/5 |
| 4,773,584 | 9/1988 | Instance | 229/74 |
| 4,781,773 | 11/1988 | Instance | 156/69 |
| 4,790,563 | 12/1988 | Instance | 283/81 |
| 4,799,712 | 1/1989 | Biava et al. | 283/81 |
| 4,801,929 | 1/1989 | Instance | 340/692 |
| 4,830,406 | 5/1989 | Instance | 283/81 |
| 4,849,043 | 7/1989 | Instance | 156/227 |
| 4,850,612 | 7/1989 | Instance | 281/5 |
| 4,850,613 | 7/1989 | Instance | 281/5 |
| 4,888,078 | 12/1989 | Instance | 156/249 |
| 4,894,106 | 1/1990 | Instance | 156/227 |
| 4,933,043 | 6/1990 | Instance | 156/248 |
| 4,976,351 | 12/1990 | Mangini et al. | 206/232 |
| 5,021,273 | 6/1991 | Kobayashi | 428/40 |
| 5,031,938 | 7/1991 | Instance | 283/81 |
| 5,048,870 | 9/1991 | Mangini et al. | 283/81 |
| 5,085,312 | 2/1992 | Ribordy et al. | 198/463.4 |
| 5,149,587 | 9/1992 | Hill et al. | 428/354 |
| 5,174,605 | 12/1992 | Instance | 281/5 |
| 5,207,458 | 5/1993 | Treichel et al. | 283/81 |
| 5,222,766 | 6/1993 | Instance | 283/81 |
| 5,234,735 | 8/1993 | Baker et al. | 428/40 |
| 5,261,520 | 11/1993 | Duke | 198/375 |
| 5,262,214 | 11/1993 | Instance | 428/40 |
| 5,264,265 | 11/1993 | Kaufmann | 428/40 |
| 5,284,363 | 2/1994 | Gartner et al. | 283/81 |
| 5,324,559 | 6/1994 | Brombacher | 428/40 |
| 5,328,208 | 7/1994 | Garrison | 283/105 |
| 5,389,415 | 2/1995 | Kaufmann | 428/40 |
| 5,399,403 | 3/1995 | Instance | 428/40 |
| 5,439,721 | 8/1995 | Pedroli et al. | 428/40 |
| 5,449,538 | 9/1995 | Denny | 428/40 |
| 5,470,418 | 11/1995 | Instance | 156/231 |
| 5,489,456 | 2/1996 | Instance | 428/40 |

*Primary Examiner*—Nasser Ahmad
*Attorney, Agent, or Firm*—Hugh D. Jaeger

[57] ABSTRACT

Product information label system having a base member and a foldout medical information pamphlet which is applied to medicinal and drug containers where the foldout pamphlet is resealable for subsequent use.

2 Claims, 40 Drawing Sheets

PRODUCT INFORMATION LABEL SYSTEM

BACKGROUND OF THE INVENTION

1. Field of the Invention

The present invention is for a medicinal information label system, and more particularly, pertains to a resealable pamphlet system having fold out informational panels for dissemination of medical and drug product information.

2. Description of the Prior Art

Prior art medical printed informational material has been difficult to read, at best, due to a myriad of required informational medical information which must be attached or included on the medical product or drug container. Reading of this small print information often requires the use of optical devices such as glasses or magnifying devices. Often dosages were improperly interpreted or conveniently ignored because it was difficult to extricate such valuable information. Users are often prone to neglect such small and difficult to read information for the above and other reasons.

Often medical printed informational material was printed in the same small type fashion and included in loose leaf form in a packaging container along with a pill bottle. The user was then free to discard the packaging container, along with the informational material, with utter disregard to retaining the information for further reference in the future. Had the user the foresight to attempt to retain the informational material, the material could be separated from the medical device or drug container and lost. The informational material could also become damaged or dog-eared if left in an unsecured state.

Clearly what is needed is a resealable product information label system which attaches to a medical product or drug container and which includes a sufficient amount of label material for sufficiently large printing.

SUMMARY OF THE INVENTION

The general purpose of the invention is a medical and/or drug container product information label system.

According to one embodiment of the present invention there is provided a product information label system having a pamphlet suitably attached to the front surface of a planar base member. The pamphlet is composed of multiple fold out informational printed paper panels covered by a polypropylene plastic laminate, having an acrylic pressure sensitive adhesive on its underside, which is secured along an area at one side of the pamphlet to the planar base member. The other side of the pamphlet secures to the planar base member by an ultraviolet cured release coating which allows the user to easily disengage that side of the pamphlet so that printed matter on the multiple fold out informational panels may be viewed. Subsequent to pamphlet viewing, the user can reseal the released side of the pamphlet for future reference.

One significant aspect and feature of the present invention is a product information label system for dissemination of medicinal or medical product information.

Another significant aspect and feature of the present invention is a product information label system which attaches to a medical device or medical drug container.

Another significant aspect and feature of the present invention is a product information label system having a pamphlet attached to a planar base member.

Another significant aspect and feature of the present invention is a product information label system having fold out informational panels.

Another significant aspect and feature of the present invention is a product information label system having panels which can accommodate an abundance of suitable text information.

Another significant aspect and feature of the present invention is fold out panels which secure and pivot about a vertical area or a horizontal area.

Another significant aspect and feature of the present invention is a product information label system having panels which fold out in accordion style.

Another significant aspect and feature of the present invention is a product information label system having panels which fold out in tuck under style or bib style.

Another significant aspect and feature of the present invention is a product information label system having a multiplicity of panels which fold out about a multiplicity of left, right, lower or upper fold areas.

Another significant aspect and feature of the present invention is a product information label system having a protective polypropylene plastic laminate covering underlying panels.

Another significant aspect and feature of the present invention is a product information label system having a protective polypropylene plastic laminate with acrylic pressure sensitive adhesive on its back side.

Another significant aspect and feature of the present invention is the use of an ultraviolet cured release coating on a base member which contacts an acrylic pressure sensitive adhesive on the underside of a polypropylene plastic laminate for purposes of sealing and resealing subsequent to release.

Another significant aspect and feature of the present invention is the use of an ultraviolet cured release coating on a base member which contacts hot melt glue on the underside of a top panel for purposes of sealing and resealing subsequent to release.

Another significant aspect and feature of the present invention is a product information label system having panels which fold about a living hinge.

Having thus described significant aspects and features of the present invention, it is the principal object of the present invention to provide a medical and/or drug container product information label system.

Alternate embodiments disclose various methods of arranging pamphlet panel foldout members and securing of pamphlets to a planar base member.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
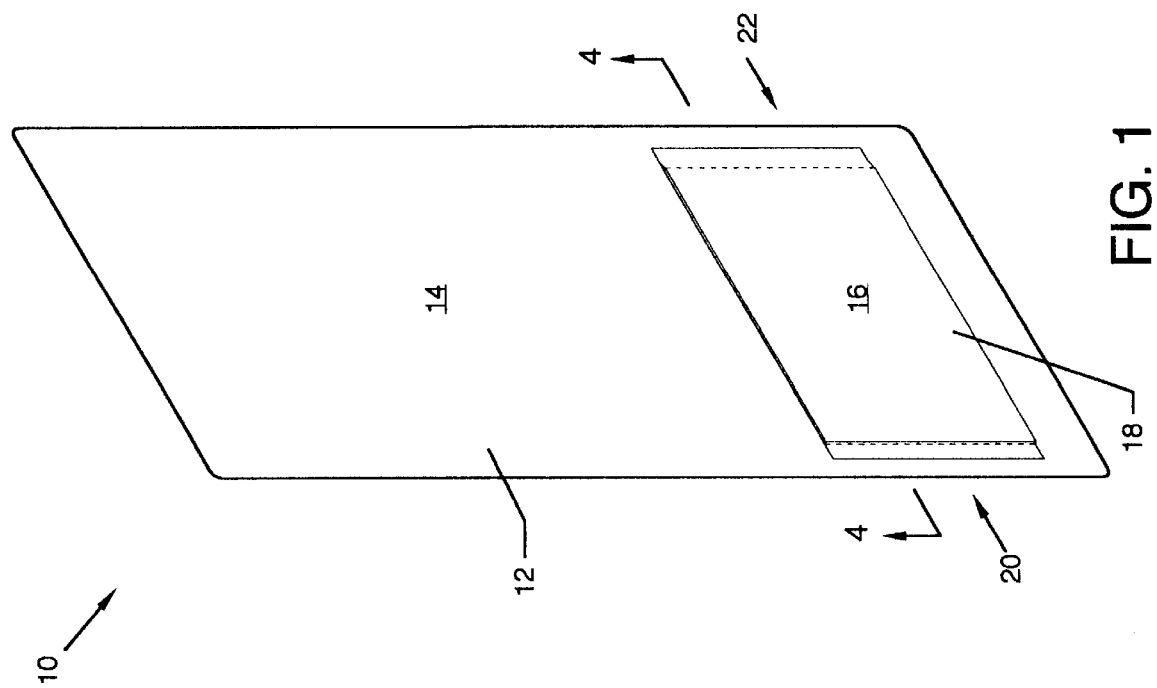
FIG. 1 illustrates an isometric view of a product information label system, the present invention.

FIG. 1 illustrates an isometric view of a product information label system 10, the present invention. The product information label system 10 includes a planar base member 12 of paper, plastic or other such suitable material which can have printed product information on its front surface 14, or which can be without printing, if desired. A pamphlet 16 is affixed to the front surface 14, as later described in detail. Pamphlet 16 is composed of multiple fold out informational printed paper panels covered by a transparent polypropylene plastic laminate 18 which is secured along an area 20 at the left side of the pamphlet 16 to the planar base member 12. The area 22 at the right side of the pamphlet 16 secures to the planar base member 12 by an ultraviolet cured release coating 24, of FIG. 2, which allows the user to easily disengage the right area 22 of the pamphlet 16 so that the printed matter on the multiple fold out informational panels may be viewed. Subsequent to pamphlet viewing, the user can reseal the right area 22 of the pamphlet 16 for future reference. The product information label system 10 can be attached, such as by adhesive, to a product, a product container or packaging material.

Figure 2:
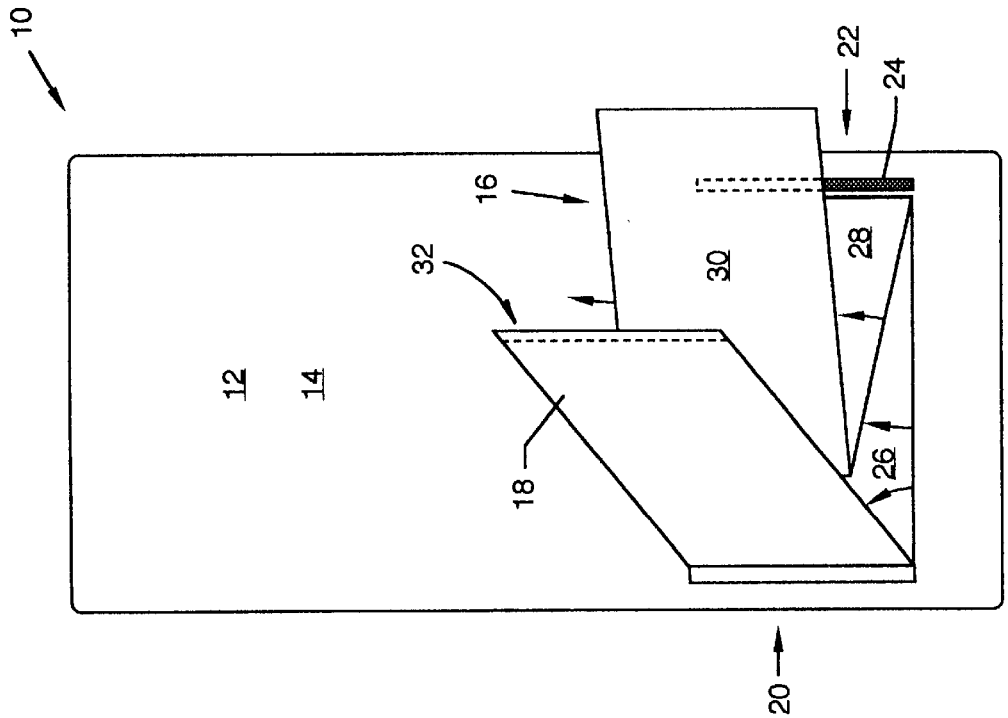
FIG. 2 illustrates a front view of the product information label system including the initial step of accessing information from a pamphlet.

FIG. 2 illustrates a front view of the product information label system 10 including the initial step of accessing information from the pamphlet 16, where all numerals correspond to those elements previously described. The first step is to manually lift the polypropylene plastic laminate 18 from engagement at the right area 22 with the ultraviolet cured release coating 24, which is located on the planar base member 12, to expose informational planar paper panels 26, 28, 30 and 32, each having product information printed on one or more appropriate surfaces. Panels 26, 28 and 30 align in pleated or accordion style, whereby each panel is in direct contact with adjacent panels. Panel 32 is secured to the underside of the polypropylene plastic laminate 18, and the remaining panels 26, 28 and 30 are free to be deployed, as depicted in FIG. 3, for informational browsing.

Figure 3:
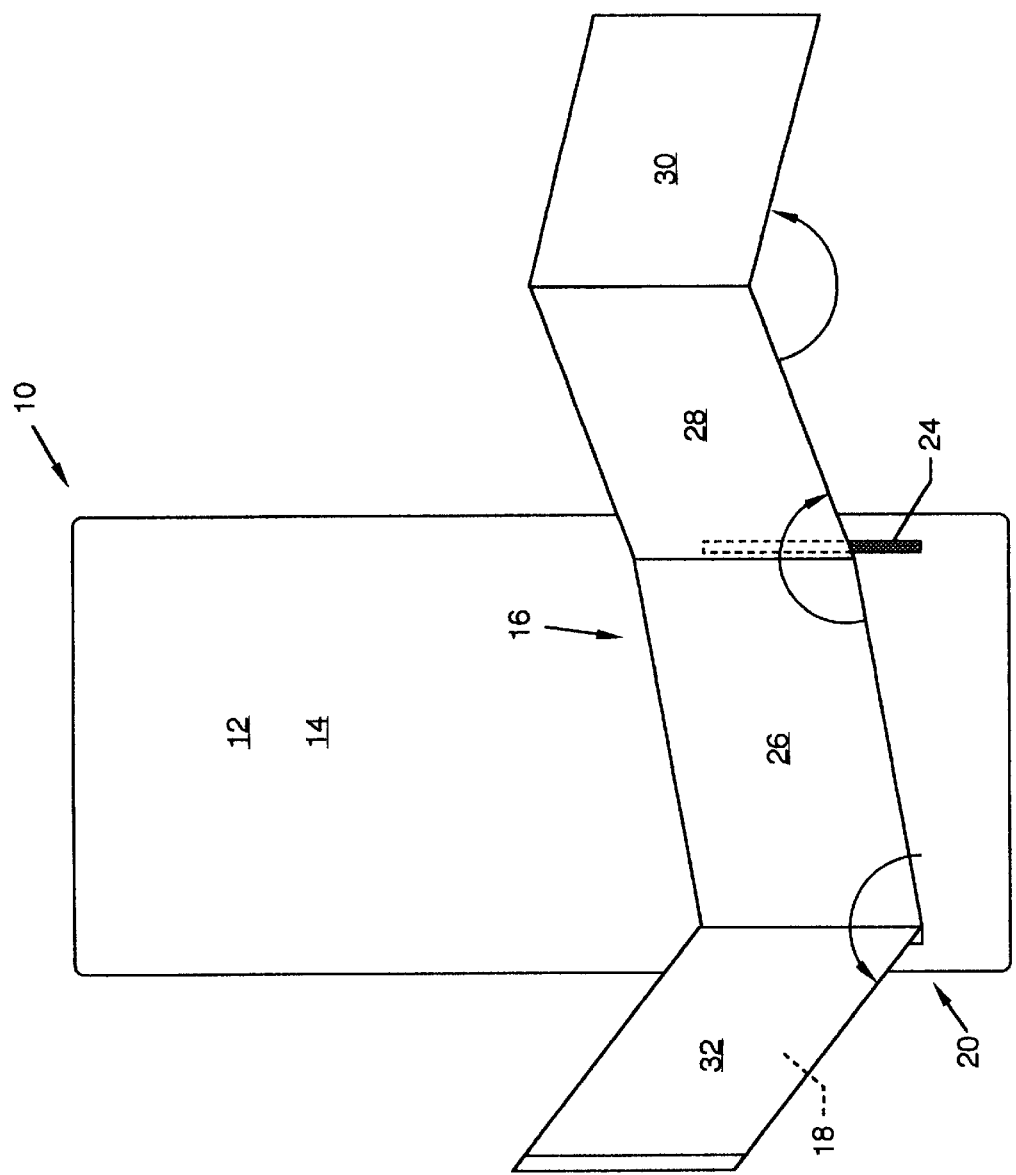
FIG. 3 illustrates the second step and full extension of the panels for accessing information from the pamphlet.

FIG. 3 illustrates the second step and full extension of the panels 26, 28 and 30 for accessing information from the pamphlet 16, where all numerals correspond to those elements previously described. As shown in this illustration, information is accessible on the front sides of panels 26, 28 and 30, the back side of panel 32, and in the area on the planar base member 12 beneath panel 26. Of course, information is also accessible on the back sides of panels 26, 28 and 30 when the panels are rotated to the left about the left area 20. Also, information is viewable on the front side of panel 32 which is attached to the transparent polypropylene plastic laminate 18. Although three fold out panels 26, 28 and 32 are illustrated, any suitable number of panels can be incorporated depending on the amount of informational material to be used.

Figure 4:
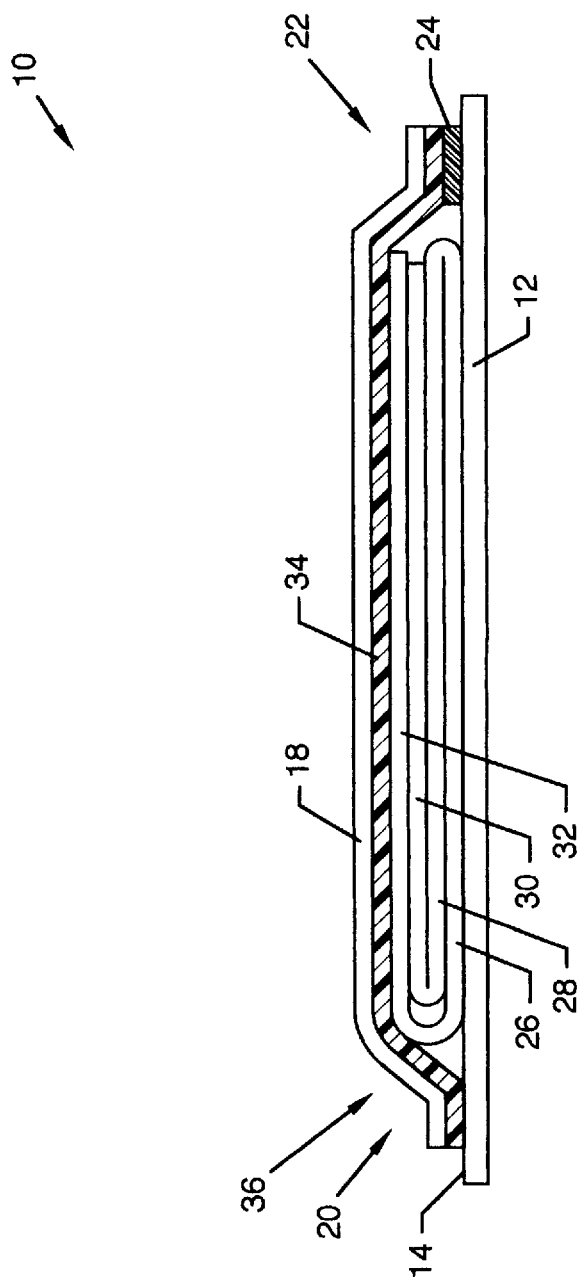
FIG. 4 illustrates a conceptual cross sectional view along line 4—4 of FIG. 1.

FIG. 4 illustrates a conceptual cross sectional view along line 4—4 of FIG. 1, where all numerals correspond to those previously described. Illustrated in particular is the method of attachment of the pamphlet members to the planar base member 12. A layer of acrylic pressure sensitive adhesive 34 is located on the inside surface of the polypropylene plastic laminate 18. The acrylic pressure sensitive adhesive layer 34 fastens the polypropylene plastic laminate 18 at the left area 20 to the planar base member 12, secures the panel 32 to the polypropylene plastic laminate 18, and also contacts the ultraviolet cured release coating 24 located on the planar base member 12 at the right area 22 of the pamphlet 16 to seal the panels 26, 28, 30 and 32 within the confines of the protective polypropylene plastic laminate 18. The left area 20 acts as a living hinge 36 for folding out of the panels 32 and 26 (and 28–30) for viewing. The use of the acrylic pressure sensitive adhesive layer 34 with the ultraviolet cured release coating 24 allows for excellent sealing and resealing characteristics, whereby the information can be accessed many times while still being able to reseal the pamphlet in a satisfactory manner.

Figure 5:
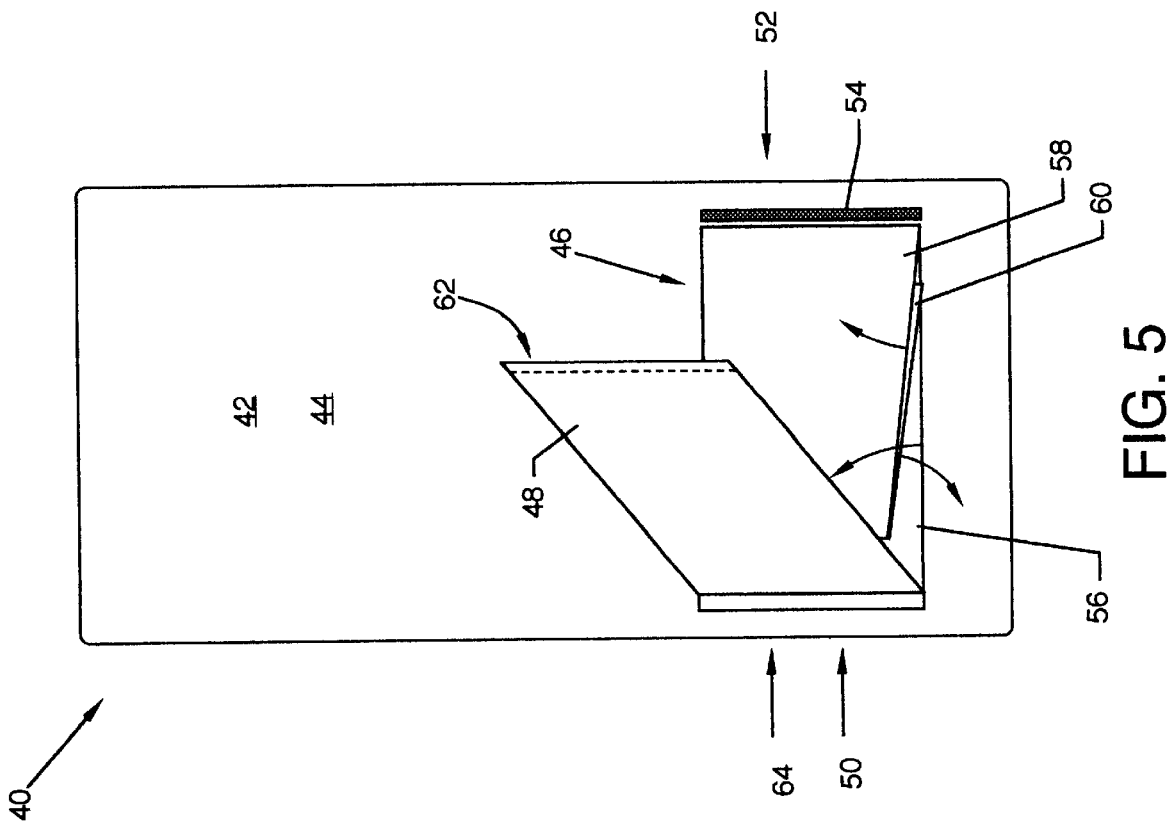
FIG. 5, a first alternative embodiment, illustrates a front view of a product information label system including the initial step of accessing information from a pamphlet.

FIG. 5, a first alternative embodiment, illustrates a front view of a product information label system 40, the present invention. The product information label system 40 includes a planar base member 42 of paper, plastic or other such suitable material which can have printed product information on its front surface 44, or which can be without printing, if desired. A pamphlet 46 is affixed to the front surface 44, as later described in detail. Pamphlet 46 is composed of multiple fold out informational printed paper panels covered by a transparent polypropylene plastic laminate 48 which is secured along an area 50 at the left side of the pamphlet 46 to the planar base member 42. The area 52 at the right side of the pamphlet 46 secures to the planar base member 42 by an ultraviolet cured release coating 54 which allows the user to easily disengage the right area 52 of the pamphlet 46 so that the printed matter on the multiple fold out informational panels may be viewed. Subsequent to pamphlet viewing, the user can reseal the right area 52 of the pamphlet 46 for future reference. The product information label system 40 can be attached, such as by adhesive, to a product or product container or packaging material.

FIG. 5 also illustrates the initial step of accessing information from the pamphlet 46. The first step is to manually lift the polypropylene plastic laminate 48 from engagement at the right area 52 with the ultraviolet cured release coating 54, which is located on the planar base member 42, to expose informational planar paper panels 56, 58, 60 and 62, each having product information printed on one or more appropriate surfaces. Panels 56, 58 and 60 align in fold and tuck under style where one panel (or more, depending on the number of panels) is folded and tucked under other panels. Panel 60 is folded over and tucked between panel 58 and panel 56. Correspondingly, an additional panel at the end of panel 60 would be folded over and tucked between panel 60 and panel 58. Panel 62 is secured to the underside of the polypropylene plastic laminate 48, and the remaining panels 56, 58 and 60 are free to be deployed, as depicted in FIG. 6, for informational browsing.

Figure 6:
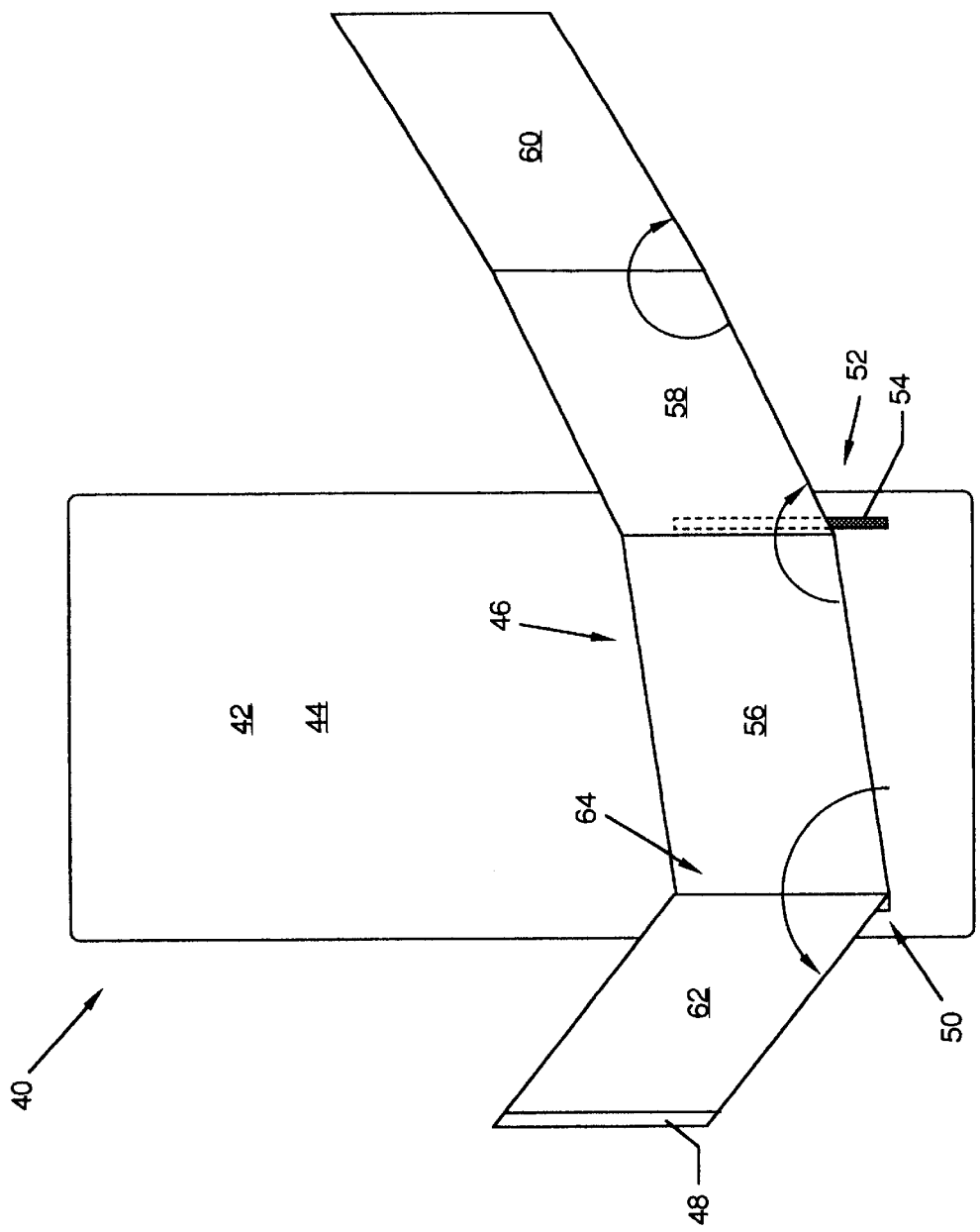
FIG. 6 illustrates the second step and full extension of the panels for accessing information from the pamphlet.

FIG. 6 illustrates the second step and full extension of the panels 56, 58 and 60 for accessing information from the pamphlet 46, where all numerals correspond to those elements previously described. As shown in this illustration, information is accessible on the front sides of panels 56, 58 and 60, the back side of panel 62, and in the area on the planar base member 42 beneath panel 56. Of course, information is also accessible on the back sides of panels 56, 58 and 60 when the panels are rotated to the left about the living hinge 64 at the left area 50. Also, information is viewable on both sides of panel 62 which is attached to the transparent polypropylene plastic laminate 48. Although three fold out panels 56, 58 and 60 are illustrated, any suitable number of panels can be incorporated depending on the amount of informational material to be incorporated.

Figure 7:
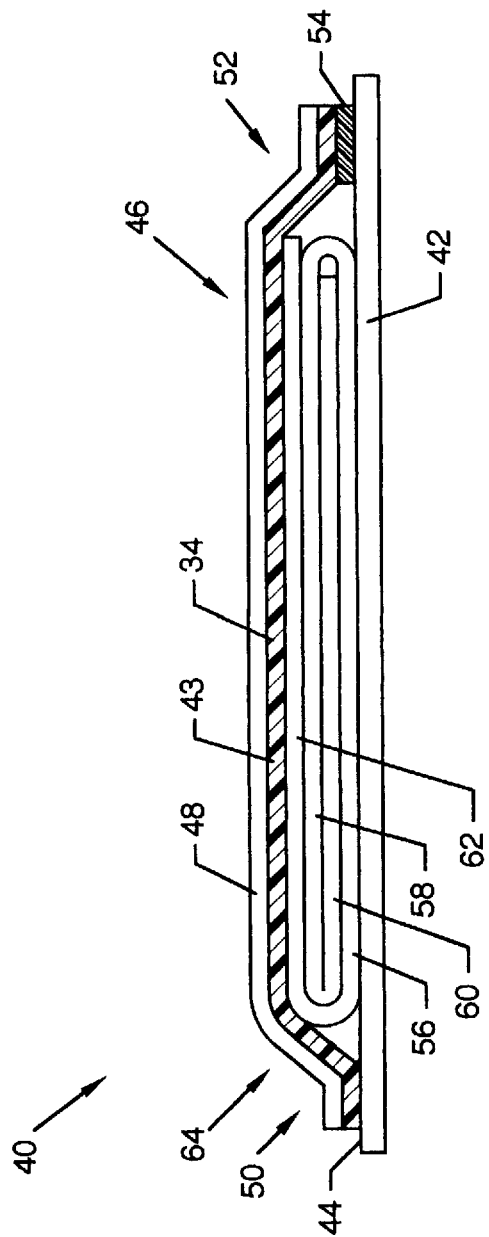
FIG. 7 illustrates a conceptual cross sectional view of the product information label system of FIG. 5.

FIG. 7 illustrates a conceptual cross sectional view of the product information label system 40, where all numerals correspond to those previously described. Illustrated in particular is the method of attachment of the pamphlet members to the planar base member 42. A layer of acrylic pressure sensitive adhesive 43 is located on the inside surface of the polypropylene plastic laminate 48. The acrylic pressure sensitive adhesive layer 43 fastens the polypropylene plastic laminate 48 at the left area 50 to the planar base member 42, secures the panel 62 to the polypropylene plastic laminate 48, and also contacts the ultraviolet cured release coating 54 located on the planar base member 42 at the right area 52 of the pamphlet 46 to seal the panels 56, 58, 60 and 62 within the confines of the protective polypropylene plastic laminate 48. The left area 50 acts as a living hinge 64 for folding out of the panels 56, 58, 60 and 62 for viewing. The use of the acrylic pressure sensitive adhesive layer 43 with the ultraviolet cured release coating 54 allows for excellent sealing and resealing characteristics, whereby the information can be accessed many times while still being able to reseal the pamphlet in a satisfactory manner.

Figure 8:
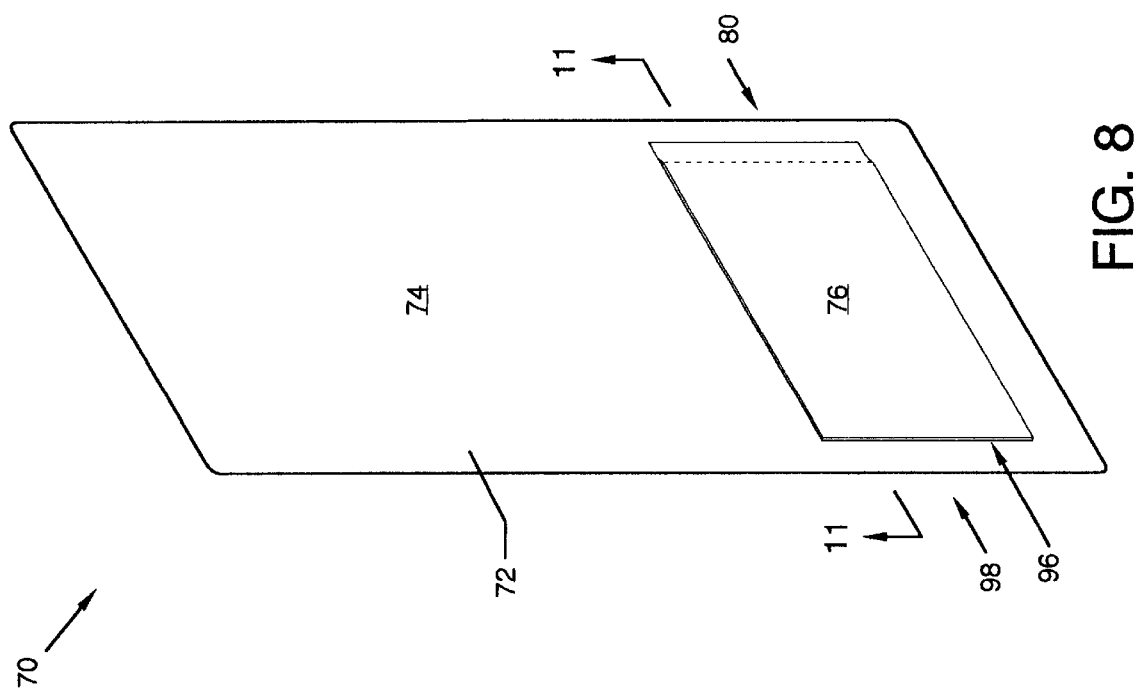
FIG. 8, a second alternative embodiment, illustrates an isometric view of a product information label system.
Figure 11:
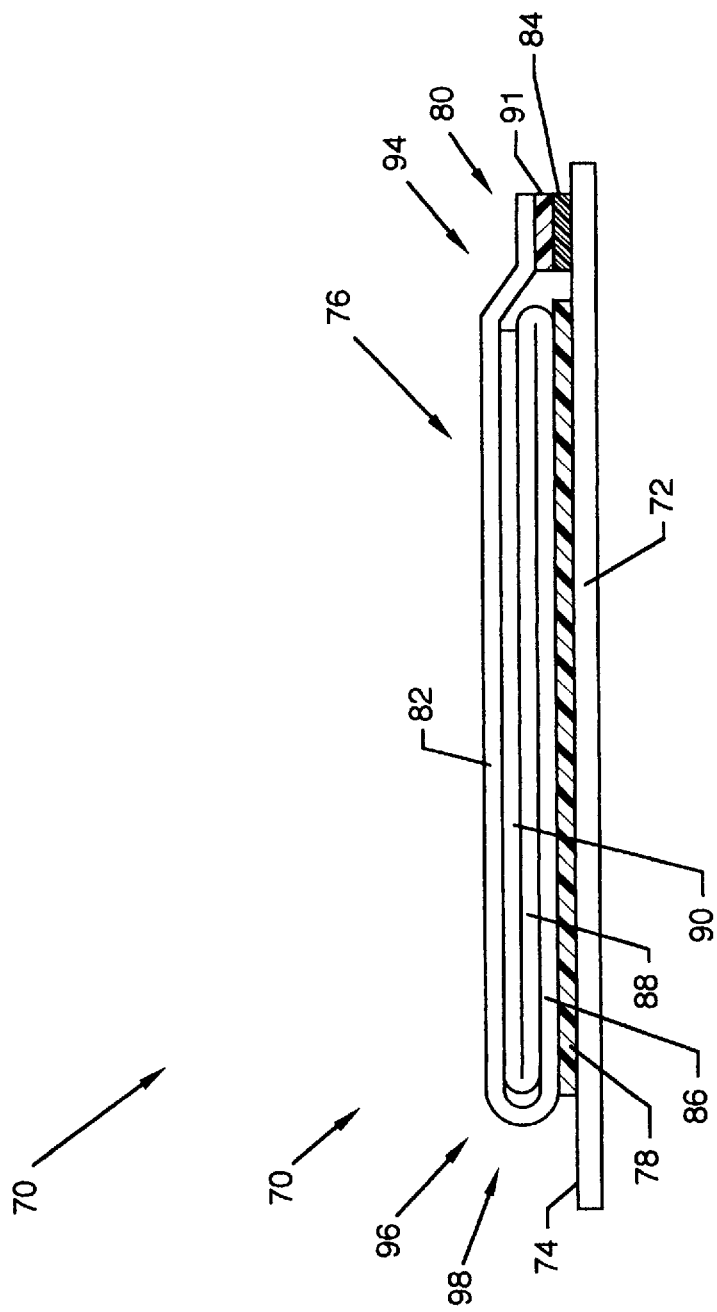
FIG. 11 illustrates a conceptual cross sectional view along line 11—11 of FIG. 8.

FIG. 8, a second alternative embodiment, illustrates an isometric view of a product information label system 70, the present invention. The product information label system 70 includes a planar base member 72 of paper, plastic or other such suitable material which can have printed product information on its front surface 74, or which can be without printing, if desired. A pamphlet 76 is affixed to the front surface 74, as later described in detail. Pamphlet 76 is composed of multiple fold out or fixed informational printed paper panels secured by hot melt adhesive 78 to the planar base member 72, as illustrated in FIG. 11. The right area 80 of the pamphlet 76 secures to the planar base member 72 by an ultraviolet cured release coating 84, of FIG. 9, which allows the user to easily disengage the right area 80 of the pamphlet 76 so that the printed matter on the multiple fold out informational panels may be viewed. Subsequent to pamphlet viewing, the user can reseal the right area 80 of the pamphlet 76 for future reference. The product information label system 70 can be attached, such as by adhesive, to a product, a product container or packaging material.

Figure 9:
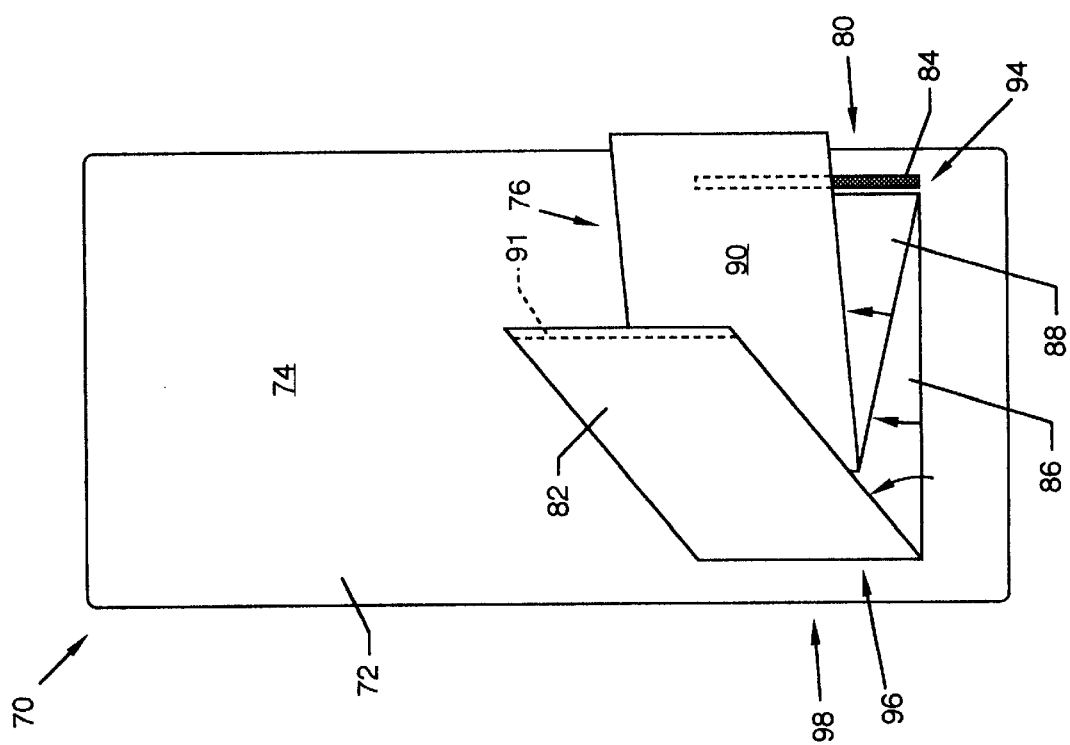
FIG. 9 illustrates a front view of the product information label system of FIG. 8 including the initial step of accessing information from a pamphlet.

FIG. 9 illustrates a front view of the product information label system 70 including the initial step of accessing information from the pamphlet 76, where all numerals correspond to those elements previously described. The first step is to manually lift the top pamphlet panel 82, having a hot melt adhesive strip 91 on the underside, from engagement at the right area 80 with the ultraviolet cured release coating 84 which is located on the planar base member 72, to expose one or more sides of informational planar paper panels 82, 86, 88, and 90, each having product information printed on one or more appropriate surfaces. Bottom panel 86 is bonded to the planar base member 72 by hot melt adhesive 78 illustrated in FIG. 11. Panels 86, 88 and 90 align in pleated or accordion style, whereby each panel is in direct contact with adjacent panels. Panel 82 acts as a top cover and sealing member for the remaining panels 86, 88 and 90, which are free to be deployed, as depicted in FIG. 10, for informational browsing.

Figure 10:
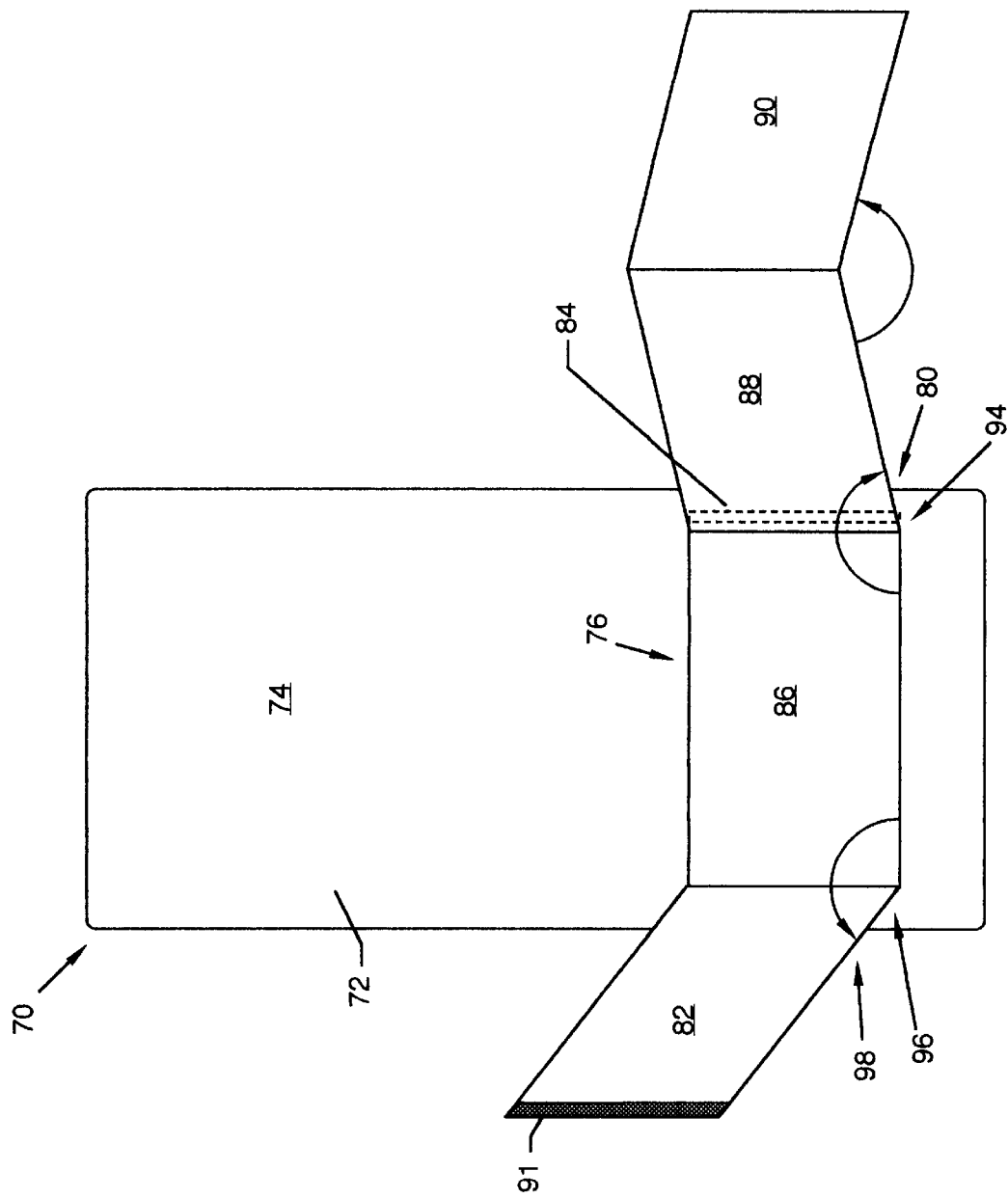
FIG. 10 illustrates the second step and full extension of the panels for accessing information from the pamphlet.

FIG. 10 illustrates the second step and full extension of the panels 82, 88 and 90 for accessing information from the pamphlet 76, where all numerals correspond to those elements previously described. As shown in this illustration, information is accessible on the front sides of panels 86, 88 and 90, and the front and back sides of panel 82, which rotates about a living hinge 96 common to panels 82 and 86 at the left area 98. Of course, information is also accessible on the back sides of panels 88 and 90 when the panels 88 and 90 are rotated to the left about the right area 80, which acts as a living hinge 94. Although two fold out panels 88 and 90 are illustrated, any suitable number of panels can be incorporated depending on the amount of informational material to be used.

FIG. 11 illustrates a conceptual cross sectional view along line 11—11 of FIG. 8, where all numerals correspond to those previously described. Illustrated in particular is the method of attachment of the pamphlet members to the planar base member 72. Hot melt adhesive 78 bonds bottom panel 86 to the planar base member 72. Hot melt adhesive strip 91 on the underside of panel 82 contacts the ultraviolet cured release coating 84 located on the planar base member 72 at the right area 80 of the pamphlet 76 to seal the panels 86, 88, and 90 within the confines of the top pamphlet panel 82. The left area 98 acts as a living hinge 96 for folding out of the panel 82 for viewing. The use of the hot melt adhesive strip 91 with the ultraviolet cured release coating 84 allows for excellent sealing and resealing characteristics, whereby the information can be accessed many times while still being able to reseal the pamphlet in a satisfactory manner.

Figure 12:
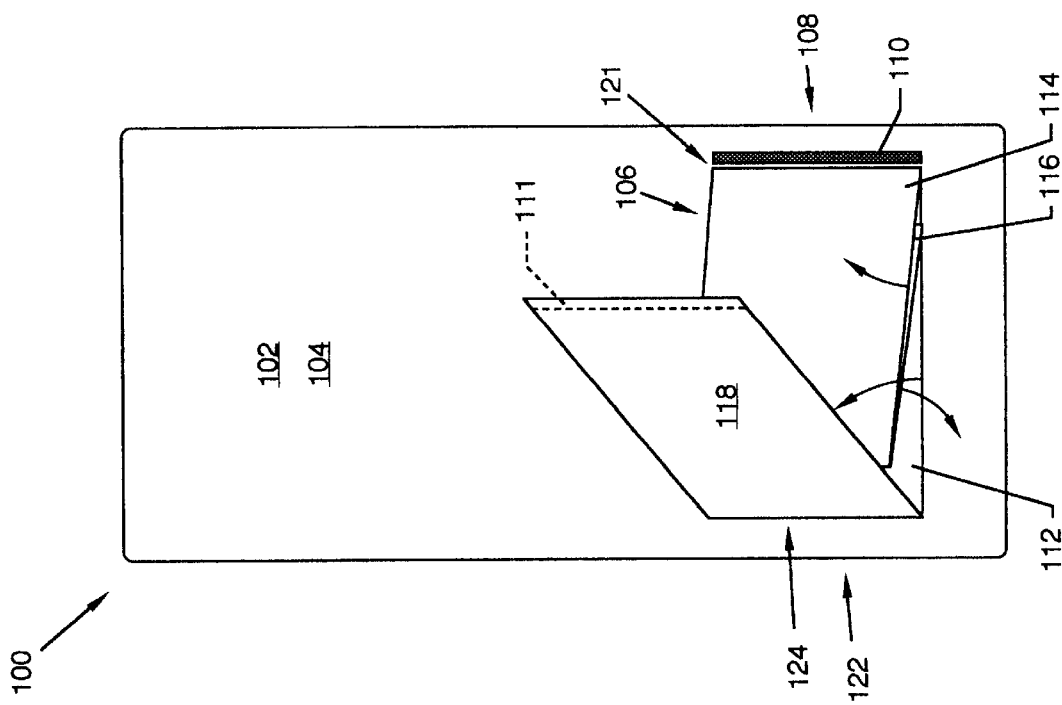
FIG. 12, a third alternative embodiment, illustrates a front view of a product information label system including the initial step of accessing information from a pamphlet.
Figure 14:
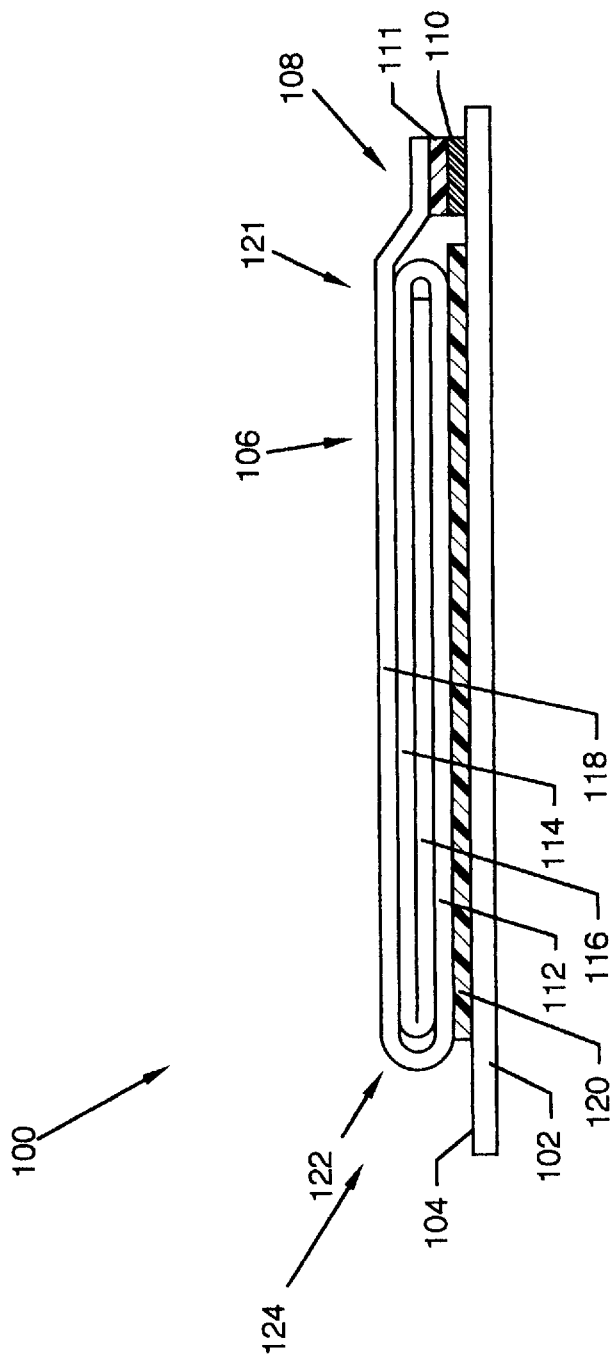
FIG. 14 illustrates a conceptual cross sectional view of the product information label system of FIG. 12.

FIG. 12, a third alternative embodiment, illustrates a front view of a product information label system 100, the present invention. The product information label system 100 includes a planar base member 102 of paper, plastic or other such suitable material which can have printed product information on its front surface 104, or which can be without printing, if desired. A pamphlet 106 is affixed to the front surface 104, as later described in detail. Pamphlet 106 is composed of multiple fold out or fixed informational printed paper panels secured by hot melt adhesive 120 to the planar base member 102, as illustrated in FIG. 14. The right area 108 of the pamphlet 106 secures to the planar base member 102 by an ultraviolet cured release coating 110 which allows the user to easily disengage the right area 108 of the pamphlet 106 so that the printed matter on the multiple fold out informational panels may be viewed. Subsequent to pamphlet viewing, the user can reseal the right area 108 of the pamphlet 106 for future reference. The product information label system 100 can be attached, such as by adhesive, to a product or product container or packaging material.

FIG. 12 also illustrates the initial step of accessing information from the pamphlet 106. The first step is to manually lift the top pamphlet panel 118, having a hot melt adhesive strip 111 on the underside, from engagement, at the right area 108, with the ultraviolet cured release coating 110 which is located on the planar base member 102, to expose one or more sides of informational planar paper panels 112, 114, 116 and 118, each having product information printed on one or more appropriate surfaces. Panels 112, 114 and 116 align in fold and tuck under style where one panel (or more, depending on the number of panels) is folded and tucked under other panels. Panel 116 is folded over and tucked between panel 114 and panel 112. Correspondingly, an additional panel at the end of panel 116 would be folded over and tucked between panel 116 and panel 114. Bottom panel 112 is bonded to the planar base member 102 by hot melt adhesive 120 illustrated in FIG. 14. Panel 118 acts as a top cover and sealing member for the remaining panels 112, 114 and 116, which are free to be deployed, as depicted in FIG. 13, for informational browsing.

Figure 13:
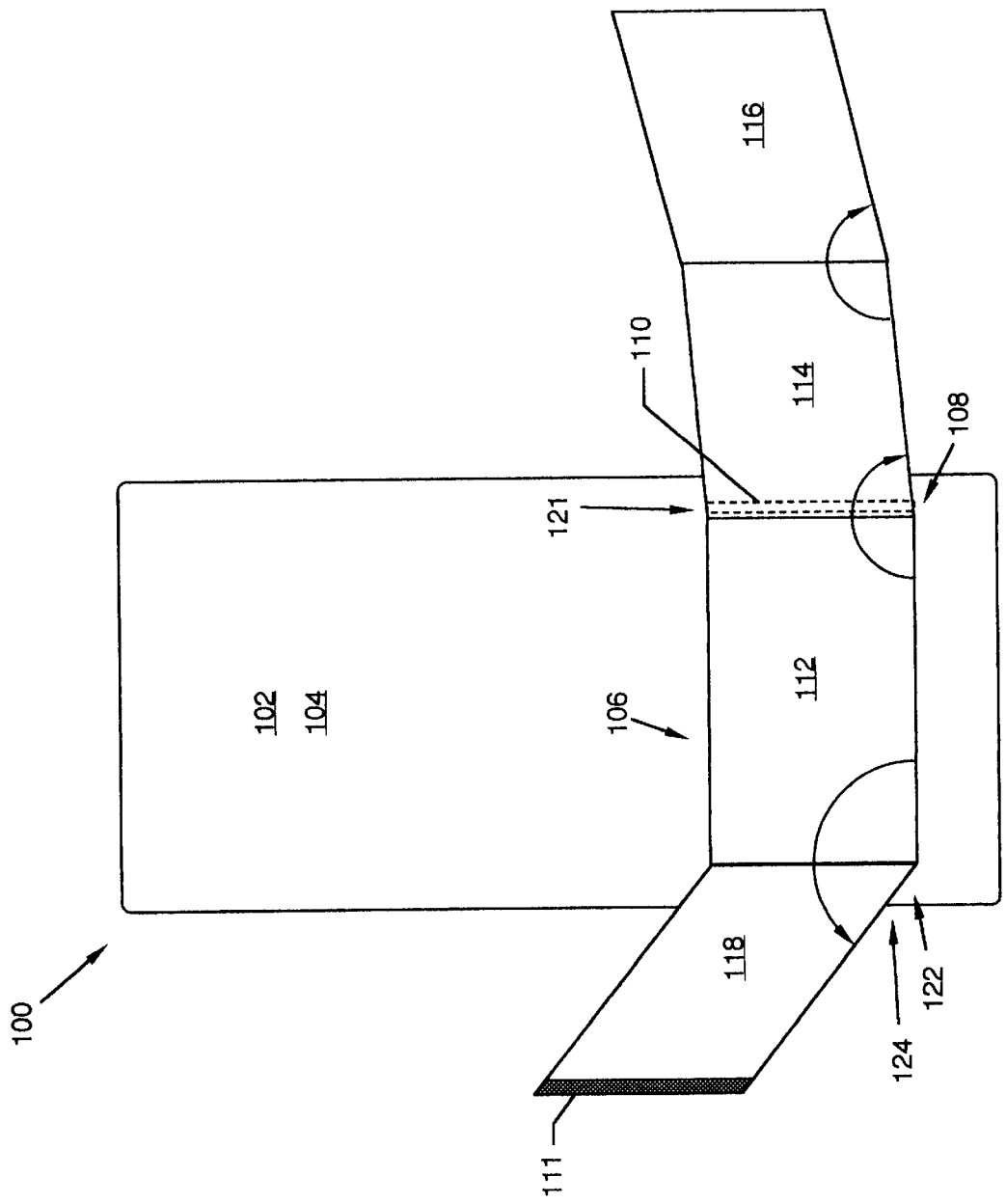
FIG. 13 illustrates the second step and full extension of the panels for accessing information from the pamphlet.

FIG. 13 illustrates the second step and full extension of the panels 114, 116 and 118 for accessing information from the pamphlet 106, where all numerals correspond to those elements previously described. As shown in this illustration, information is accessible on the front sides of panels 112, 114, 116 and the back side of panel 118. Of course, information is also accessible on the back sides of panels 114 and 116 when the panels are rotated to the left about the living hinge 121 at the right area 108. Also, information is viewable on both sides of panel 118, which rotates about living hinge 122 common to panels 112 and 118 at the left area 124. Although two fold out panels 114 and 116 are illustrated, any suitable number of panels can be incorporated depending on the amount of informational material to be incorporated.

FIG. 14 illustrates a conceptual cross sectional view of the product information label system 100, where all numerals correspond to those previously described. Illustrated in particular is the method of attachment of the pamphlet members to the planar base member 102. Hot melt adhesive 120 bonds bottom panel 112 to the planar base member 102. Hot melt adhesive strip 111 on the underside of panel 118 contacts the ultraviolet cured release coating 110 located on the planar base member 102 at the right area 108 of the pamphlet 106 to seal the panels 112, 114 and 116 within the confines of the top pamphlet panel 118. The left area 124 acts as a living hinge 122 for folding out of the panel 118 for viewing. The use of hot melt adhesive strip 111 with the ultraviolet cured release coating 110 allows for excellent sealing and resealing characteristics, whereby the information can be accessed many times while still being able to reseal the pamphlet in a satisfactory manner.

Figure 15:
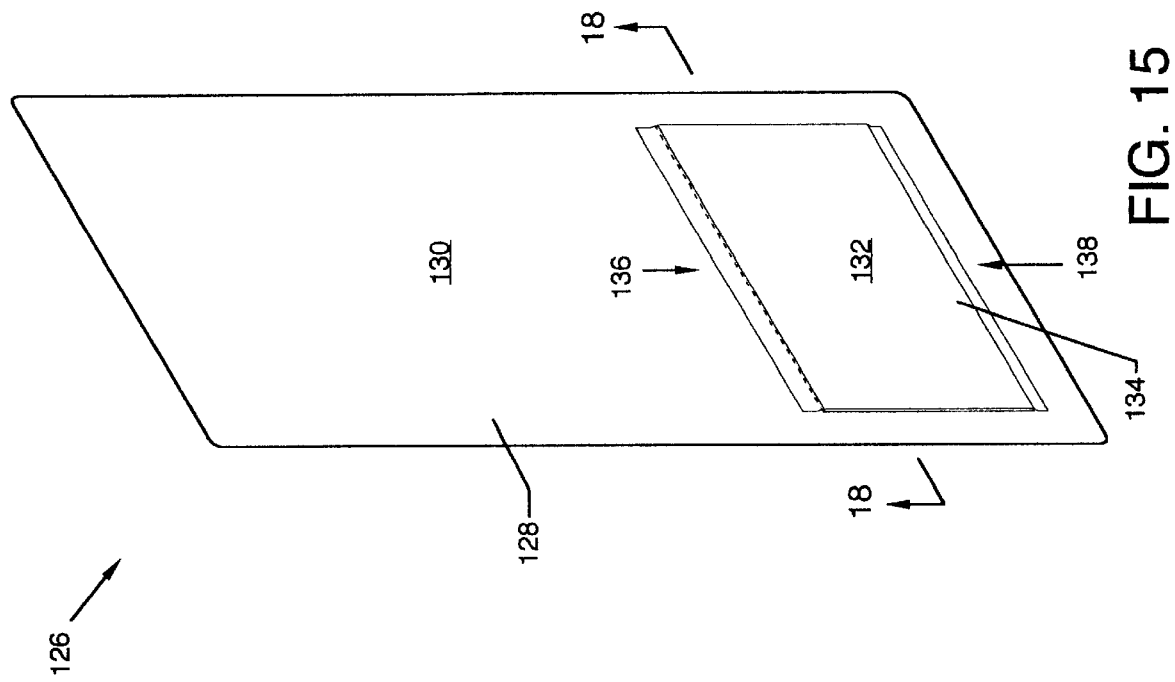
FIG. 15, a fourth alternative embodiment, illustrates an isometric view of a product information label system.

FIG. 15, a fourth alternative embodiment, illustrates an isometric view of a product information label system 126, the present invention. The product information label system 126 includes a planar base member 128 of paper, plastic or other such suitable material which can have printed product information on its front surface 130, or which can be without printing, if desired. A pamphlet 132 is affixed to the front surface 130, as later described in detail. Pamphlet 132 is composed of multiple fold out informational printed paper panels covered by a transparent polypropylene plastic laminate 134 which is secured along an upper area 136 of the pamphlet 132 to the planar base member 128. The lower area 138 of the pamphlet 132 secures to the planar base member 128 by an ultraviolet cured release coating 140 which allows the user to easily disengage the lower area 138 of the pamphlet 132 so that the printed matter on the multiple fold out informational panels may be viewed. Subsequent to pamphlet viewing, the user can reseal the lower area 138 of the pamphlet 132 for future reference. The product information label system 126 can be attached, such as by adhesive, to a product, a product container or packaging material.

Figure 16:
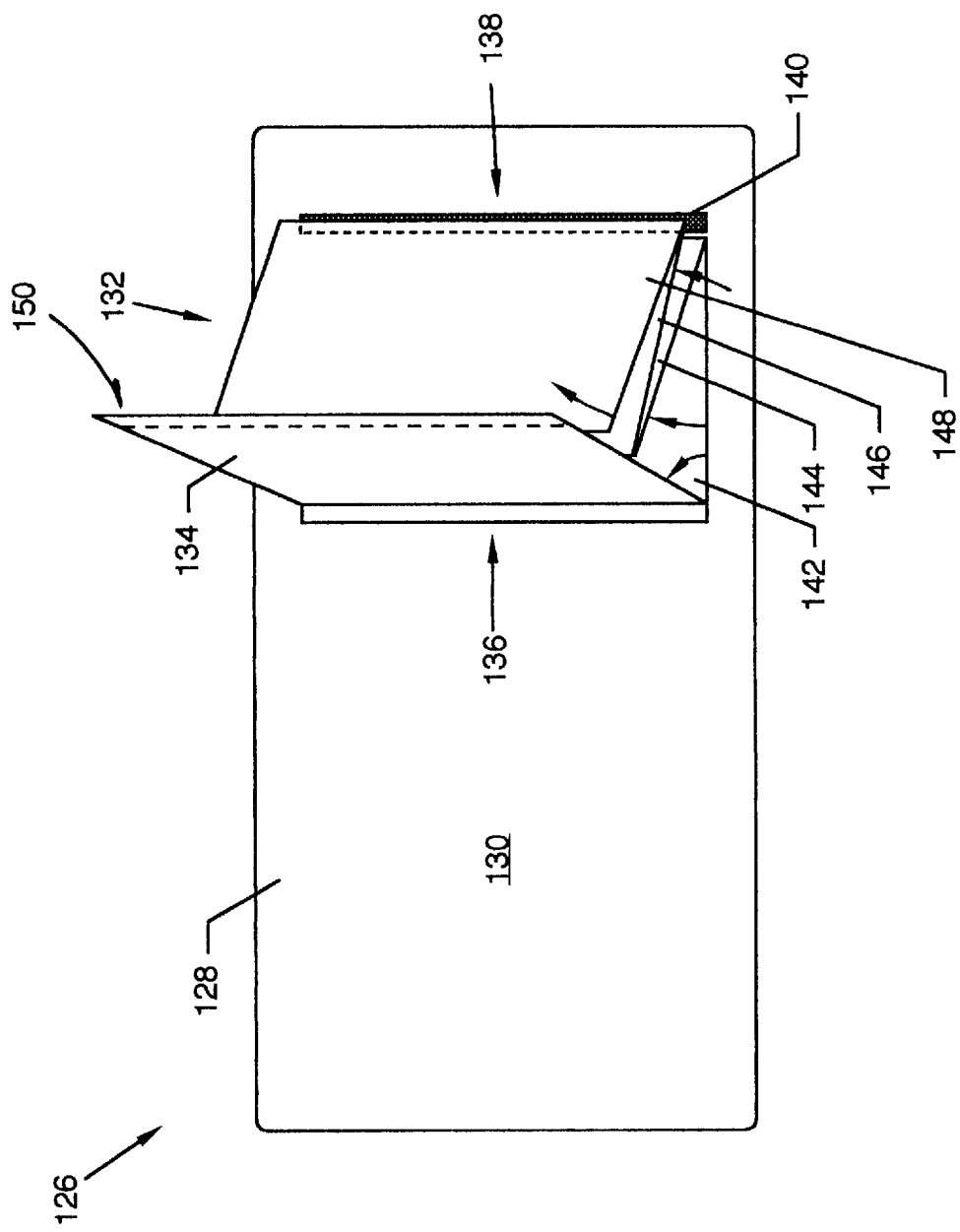
FIG. 16 illustrates a front view of the product information label system of FIG. 15 including the initial step of accessing information from a pamphlet.

FIG. 16 illustrates a front view of the product information label system 126 including the initial step of accessing information from the pamphlet 132, where all numerals correspond to those elements previously described. The product information label system 126 is rotated 90° from the view of FIG. 15 for illustration purposes. The first step is to manually lift the polypropylene plastic laminate 134 from engagement at the lower area 138 with the ultraviolet cured release coating 140 which is located on the planar base member 128, to subsequently expose informational planar paper panels 142, 144, 146, 148 and 150, each having product information printed on one or more appropriate surfaces. Panels 142, 144 , 146 and 148 align in pleated or accordion style, whereby each panel is in direct contact with adjacent panels. Panel 150 is secured to the underside of the transparent polypropylene plastic laminate 134, and the remaining panels 142, 144, 146 and 148 are free to be deployed, as depicted in FIG. 17, for informational browsing.

Figure 17:
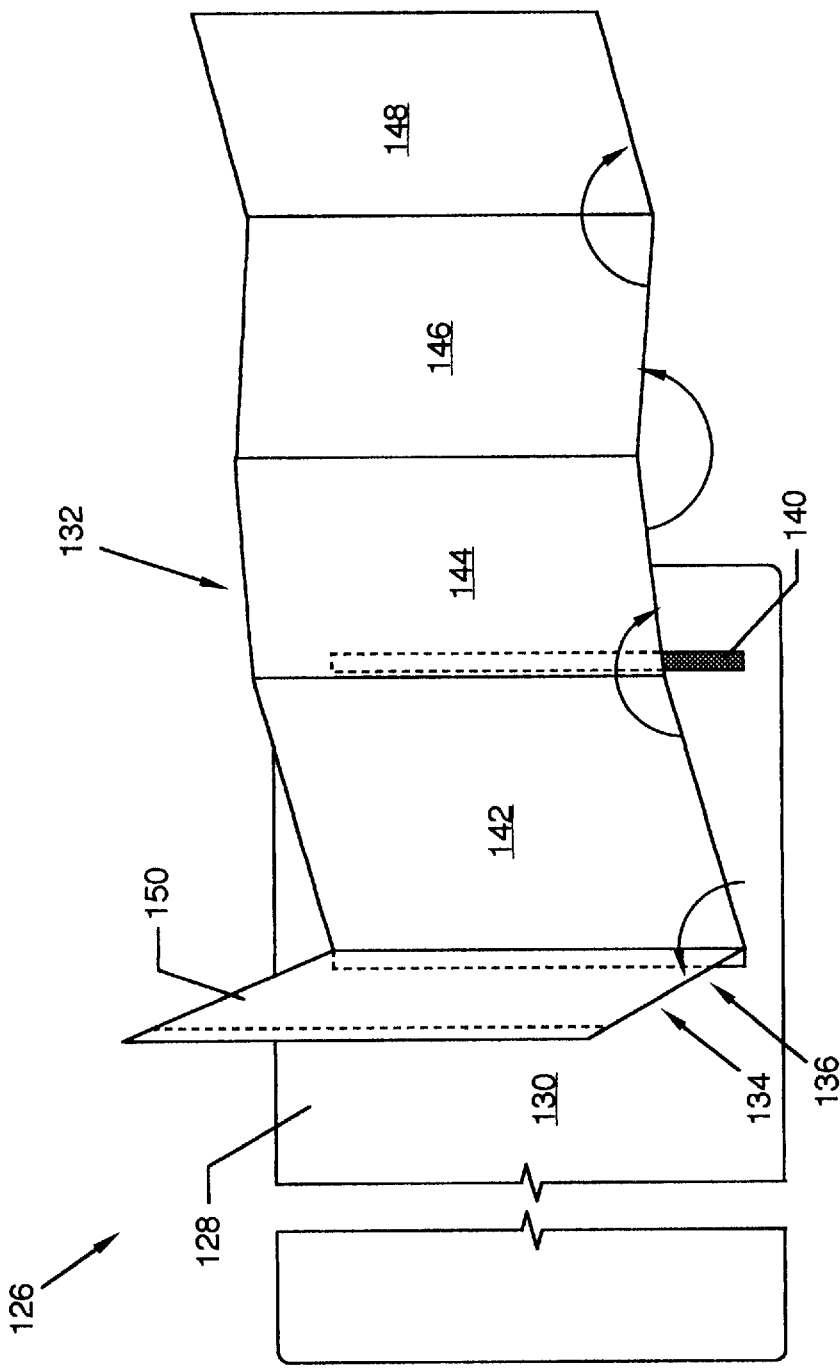
FIG. 17 illustrates the second step and full extension of the panels for accessing information from the pamphlet.

FIG. 17 illustrates the second step and full extension of the panels 142, 144, 146 and 148 for accessing information from the pamphlet 132, where all numerals correspond to those elements previously described. As shown in this rotated illustration, information is accessible on the front sides of panels 142, 144, 146 and 148, the back side of panel 150, and in the area on the planar base member 128 beneath panel 142. Of course, information is also accessible on the back sides of panels 142, 144, 146 and 148 when the panels are rotated to the left about the area 136. Also, information is viewable on the front side of panel 150 which is attached to the transparent polypropylene plastic laminate 134. Although four fold out panels 142, 144, 146 and 148 are illustrated, any suitable number of panels can be incorporated depending on the amount of informational material to be used.

Figure 18:
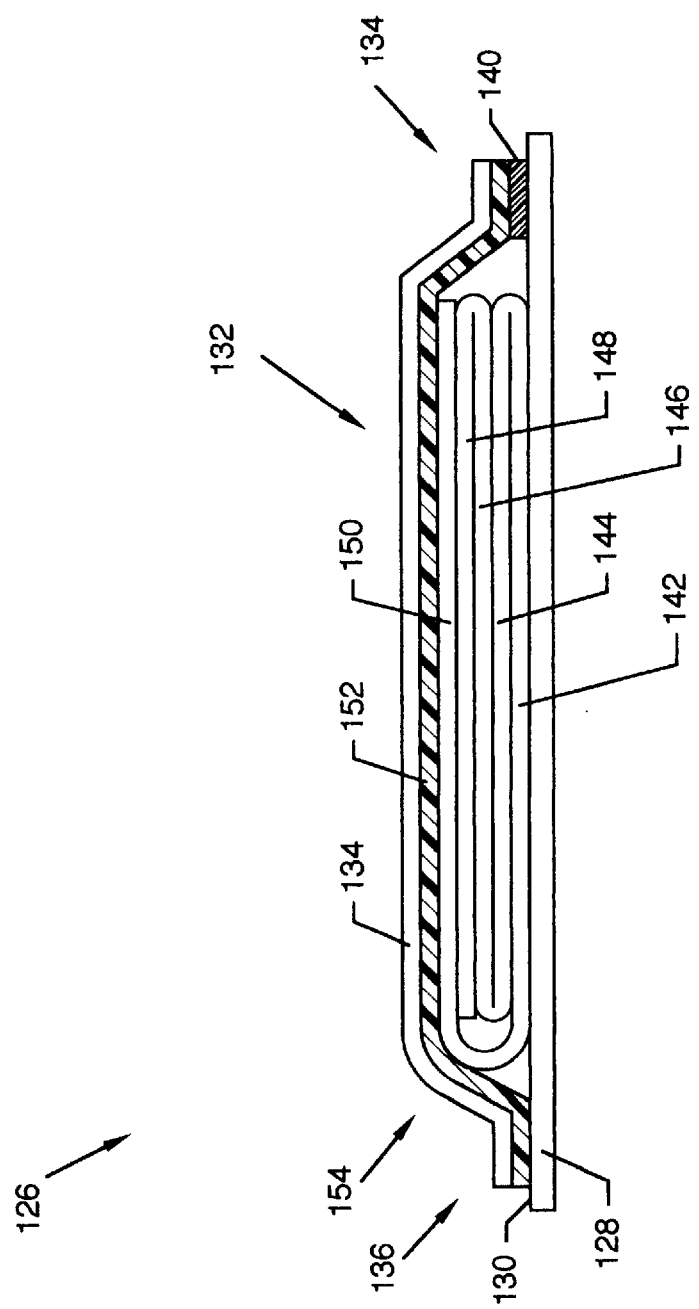
FIG. 18 illustrates a conceptual cross sectional view along line 18—18 of FIG. 15.

FIG. 18 illustrates a conceptual cross sectional view along line 18—18 of FIG. 15, where all numerals correspond to those previously described. Illustrated in particular is the method of attachment of the pamphlet members to the planar base member 128. A layer of acrylic pressure sensitive adhesive 152 is located on the inside surface of the polypropylene plastic laminate 134. The acrylic pressure sensitive adhesive layer 152 fastens the polypropylene plastic laminate 134 at area 136 to the planar base member 128, secures the panel 150 to the polypropylene plastic laminate 134, and also contacts the ultraviolet cured release coating 140 located on the planar base member 128 at area 138 of the pamphlet 132 to seal the panels 142, 144, 146, 148 and 150 within the confines of the protective polypropylene plastic laminate 134. The area 136 acts as a living hinge 154 for folding out of the panels 142, 144, 146, 148 and 150 for viewing. The use of the pressure sensitive adhesive layer 152 with the ultraviolet cured release coating 140 allows for excellent sealing and resealing characteristics, whereby the information can be accessed many times while still being able to reseal the pamphlet in a satisfactory manner.

Figure 19:
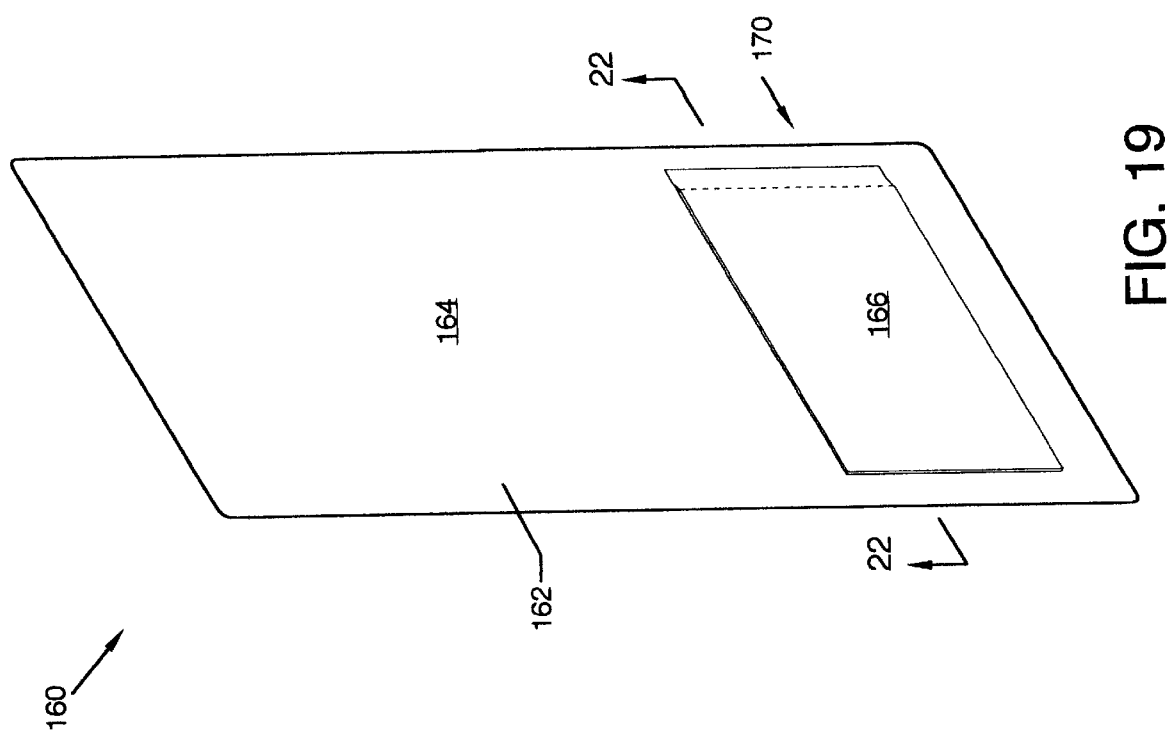
FIG. 19, a fifth alternative embodiment, illustrates an isometric view of a product information label system.
Figure 22:
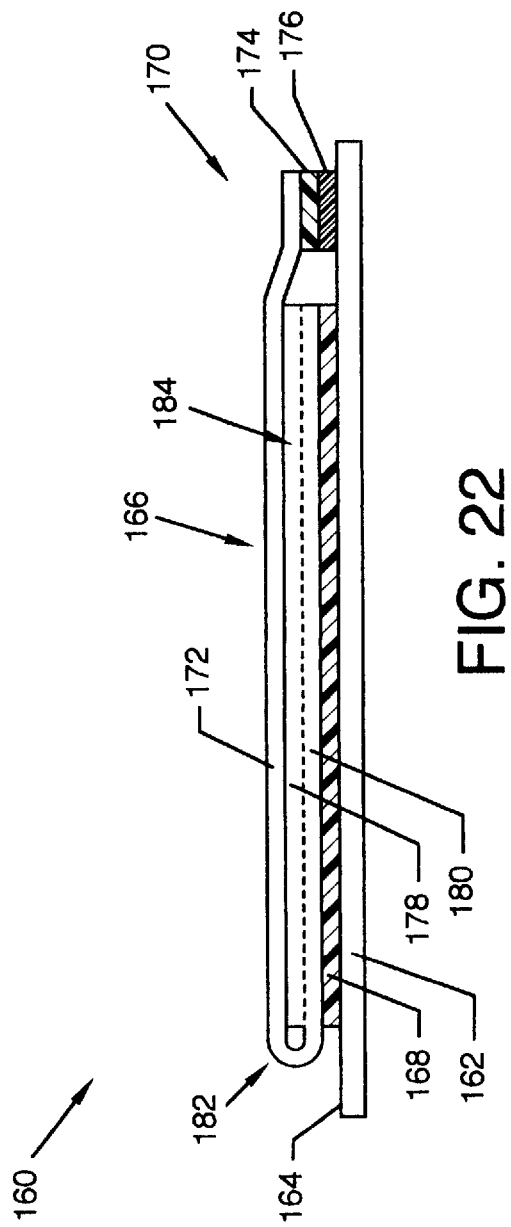
FIG. 22 illustrates a conceptual cross-sectional view along line 22—22 of FIG. 19.

FIG. 19, a fifth alternative embodiment, illustrates an isometric view of a product information label system 160, the present invention. The product information label system 160 includes a planar base member 162 of paper, plastic or other such suitable material which can have printed product information on its front surface 164, or which can be without printing, if desired. A pamphlet 166 is affixed to the front surface 164, as later described in detail. Pamphlet 166 is composed of multiple fold out or fixed informational printed paper panels secured by hot melt adhesive 168 to the planar base member 162, as illustrated in FIG. 22. The right area 170 of the pamphlet 166 secures to the planar base member 162 by an ultraviolet cured release coating 176, of FIG. 20, which allows the user to easily disengage the right area 170 of the pamphlet 166 so that the printed matter on the fold out informational panels may be viewed. Subsequent to pamphlet viewing, the user can reseal the right area 170 of the pamphlet 166 for future reference. The product information label system 160 can be attached, such as by adhesive, to a product, a product container or packaging material.

Figure 20:
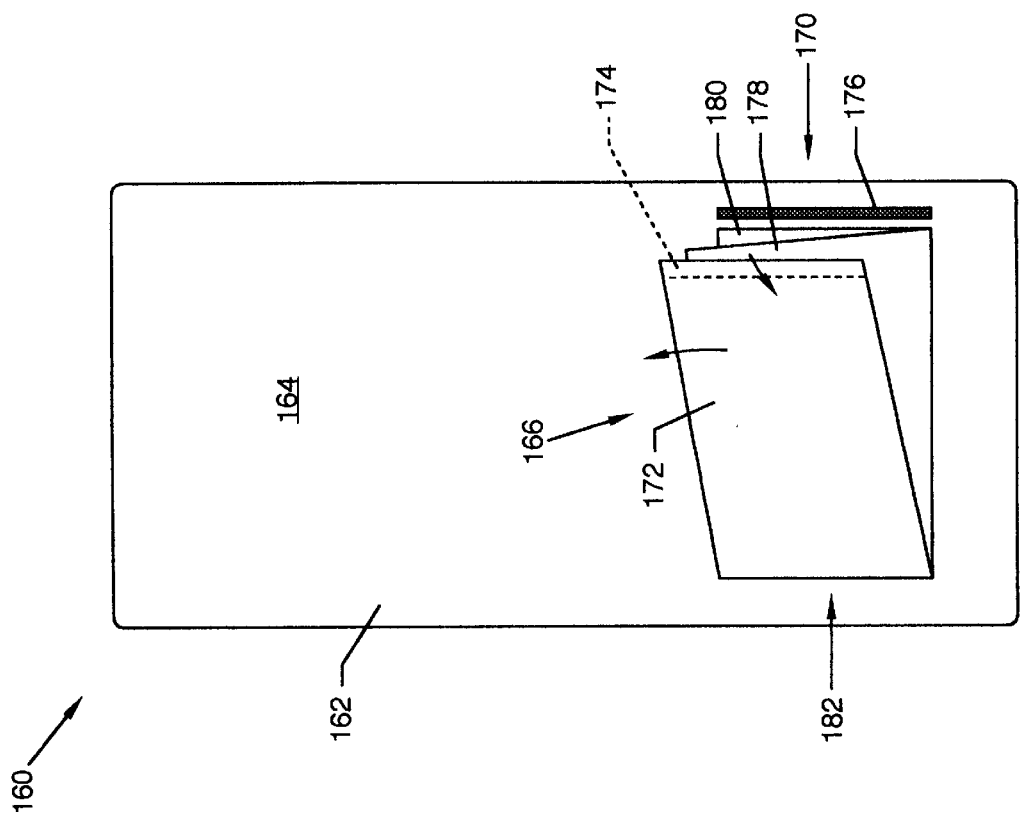
FIG. 20 illustrates a front view of the product information label system of FIG. 19 including the initial step of accessing information from a pamphlet.

FIG. 20 illustrates a front view of the product information label system 160 including the initial step of accessing information from the pamphlet 166, where all numerals correspond to those elements previously described. The first step is to manually lift the edge of the top pamphlet panel 172, having a hot melt adhesive strip 174, of FIG. 21, on the underside, from engagement, at the right area 170, with an ultraviolet cured release coating 176, of FIG. 21, which is located on the planar base member 162, to expose one or more sides of informational planar paper panels 172, 178 and 180, each having product information printed on one or more appropriate surfaces. Bottom panel 180 is bonded to the planar base member 162 by hot melt adhesive 168 illustrated in FIG. 22. Panels 172 and 178 align and fold about panel 180, as later illustrated. Panel 172 acts as a top cover and sealing member for the remaining panels 178 and 180, which are free to be deployed, as depicted in FIG. 21, for informational browsing.

Figure 21:
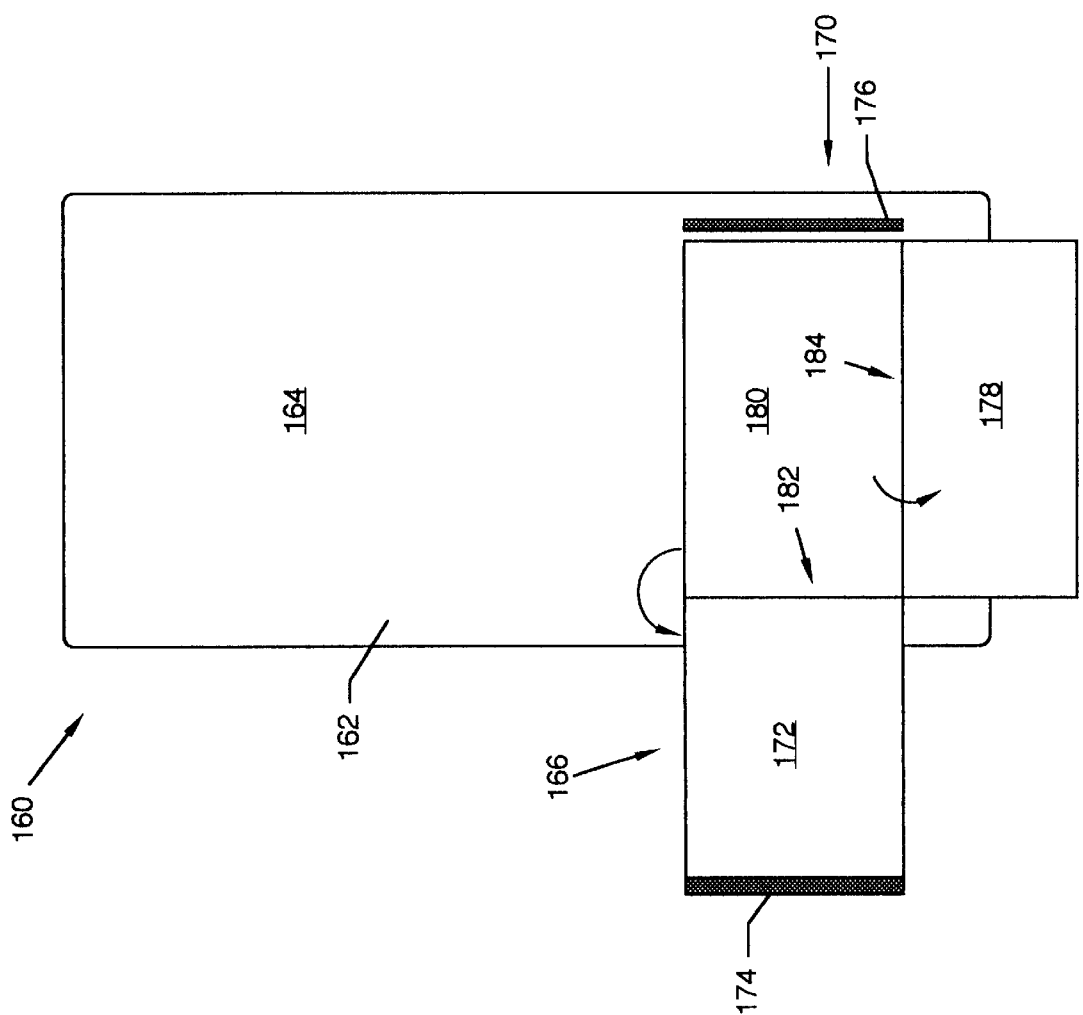
FIG. 21 illustrates the second step and full extension of the panels for accessing information from the pamphlet.

FIG. 21 illustrates the second step and full extension of the panels 172, and 178 for accessing information from the pamphlet 166, where all numerals correspond to those elements previously described. As shown in this illustration, information is accessible on the front side of panel 180 and the front and back sides of panels 172 and 178, which rotate about living hinges 182 and 184 common to panel 180. Although two fold out panels 172 and 178 are illustrated, any suitable number of panels, including accordion style panels, can be incorporated depending on the amount of informational material to be used.

FIG. 22 illustrates a conceptual cross sectional view of the product information label system 160 along line 22—22 of FIG. 19, where all numerals correspond to those previously described. Illustrated in particular is the method of attachment of the pamphlet members to the planar base member 162. Hot melt adhesive 168 bonds bottom panel 180 to the planar base member 162. Hot melt adhesive strip 174 on the underside of panel 172 contacts the ultraviolet cured release coating 176 located on the planar base member 162 at the right area 170 of the pamphlet 166, to seal the panels 178 and 180 within the confines of the top pamphlet panel 172. The use of hot melt adhesive strip 174 with the ultraviolet cured release coating 176 allows for excellent sealing and resealing characteristics, whereby the information can be accessed many times while still being able to reseal the pamphlet in a satisfactory manner.

Figure 23:
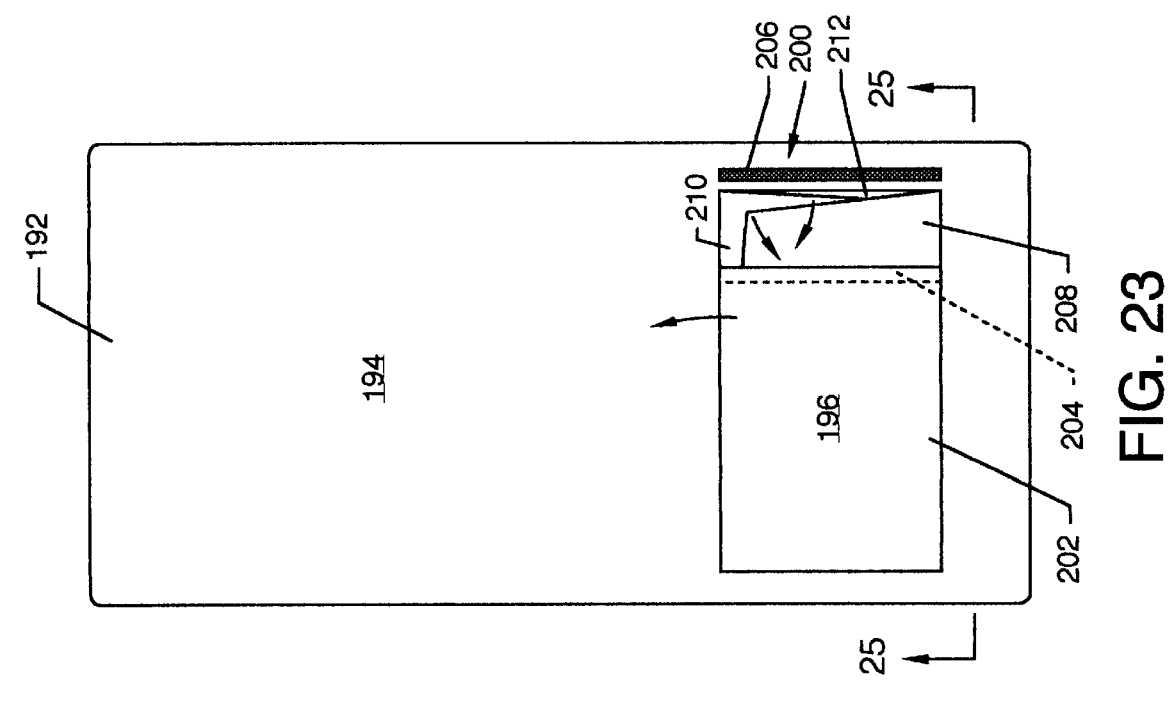
FIG. 23, a sixth alternative embodiment, illustrates a front view of a product information label system including the initial step of accessing information from a pamphlet.
Figure 25:
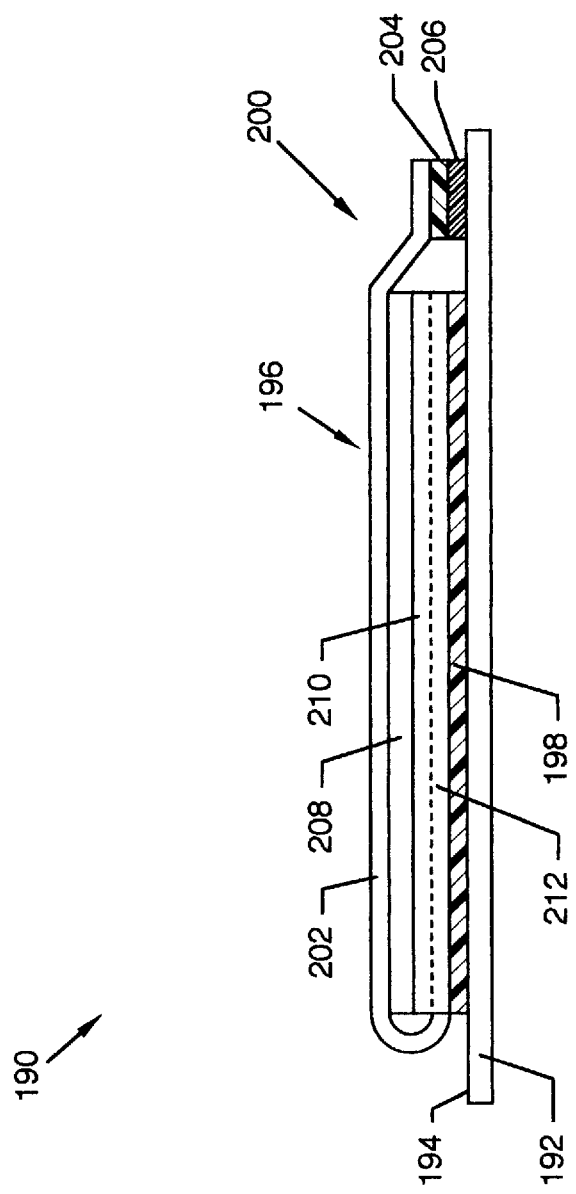
FIG. 25 illustrates a conceptual cross sectional view along line 25—25 of FIG. 23.

FIG. 23, a sixth alternative embodiment, illustrates a front view of a product information label system 190, the present invention. The product information label system 190 includes a planar base member 192 of paper, plastic or other such suitable material which can have printed product information on its front surface 194, or which can be without printing, if desired. A pamphlet 196 is affixed to the front surface 194, as later described in detail. Pamphlet 196 is composed of multiple fold out or fixed informational printed paper panels secured by hot melt adhesive 198 to the planar base member 192, as illustrated in FIG. 25. The lower area 200 of the pamphlet 196 secures to the planar base member 192 by an ultraviolet cured release coating 206 which allows the user to easily disengage the lower area 200 of the pamphlet 196 so that the printed matter on the fold out informational panels may be viewed. Subsequent to pamphlet viewing, the user can reseal the lower area 200 of the pamphlet 196 for future reference. The product information label system 190 can be attached, such as by adhesive, to a product, a product container or packaging material.

FIG. 23 also illustrates the initial step of accessing information from the pamphlet 196. The first step is to manually lift the edge of the top pamphlet panel 202, having a hot melt adhesive strip 204 on the underside, from engagement, at the lower area 200, with the ultraviolet cured release coating 206, which is located on the planar base member 192, to expose one or more sides of informational planar paper panels 202, 208, 210 and 212, each having product information printed on one or more appropriate surfaces. Bottom panel 212 is bonded to the planar base member 192 by hot melt adhesive 198 illustrated in FIG. 25. Panels 202, 208 and 210 align and fold about panel 212, as later illustrated. Panel 202 acts as a top cover and sealing member for the remaining panels 208, 210 and 212, which are free to be deployed, as depicted in FIG. 25, for informational browsing.

Figure 24:
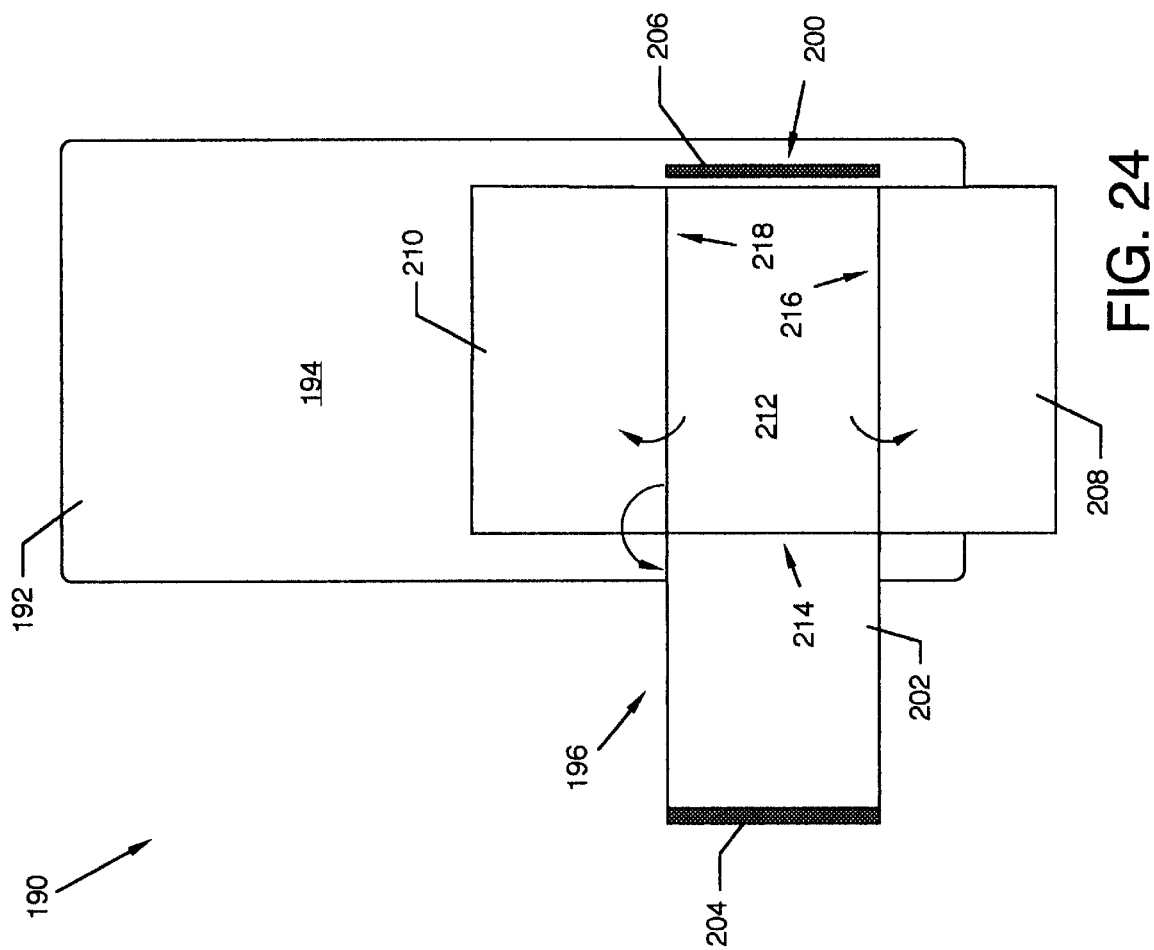
FIG. 24 illustrates the second step and full extension of the panels for accessing information from the pamphlet.

FIG. 24 illustrates the second step and full extension of the panels 202, 208 and 210 for accessing information from the pamphlet 196, where all numerals correspond to those elements previously described. As shown in this illustration, information is accessible on the front side of panel 212 and the front and back sides of panels 202, 208 and 210, which rotate about living hinges 214, 216 and 218 common to panel 212. Although three fold out panels 202, 208 and 210 are illustrated, any suitable number of panels, including accordion style panels, can be incorporated depending on the amount of informational material to be used.

FIG. 25 illustrates a conceptual cross sectional view along line 25—25 of FIG. 23, where all numerals correspond to those previously described. Illustrated in particular is the method of attachment of the pamphlet members to the planar base member 192. Hot melt adhesive 198 bonds bottom panel 212 to the planar base member 192. Hot melt adhesive strip 204 on the underside of panel 202 contacts the ultraviolet cured release coating 206 located on the planar base member 192 at area 200 of the pamphlet 196, to seal the panels 208 and 210 within the confines of the top pamphlet panel 202. The use of hot melt adhesive strip 204 with the ultraviolet cured release coating 206 allows for excellent sealing and resealing characteristics, whereby the information can be accessed many times while still being able to reseal the pamphlet in a satisfactory manner.

Figure 26:
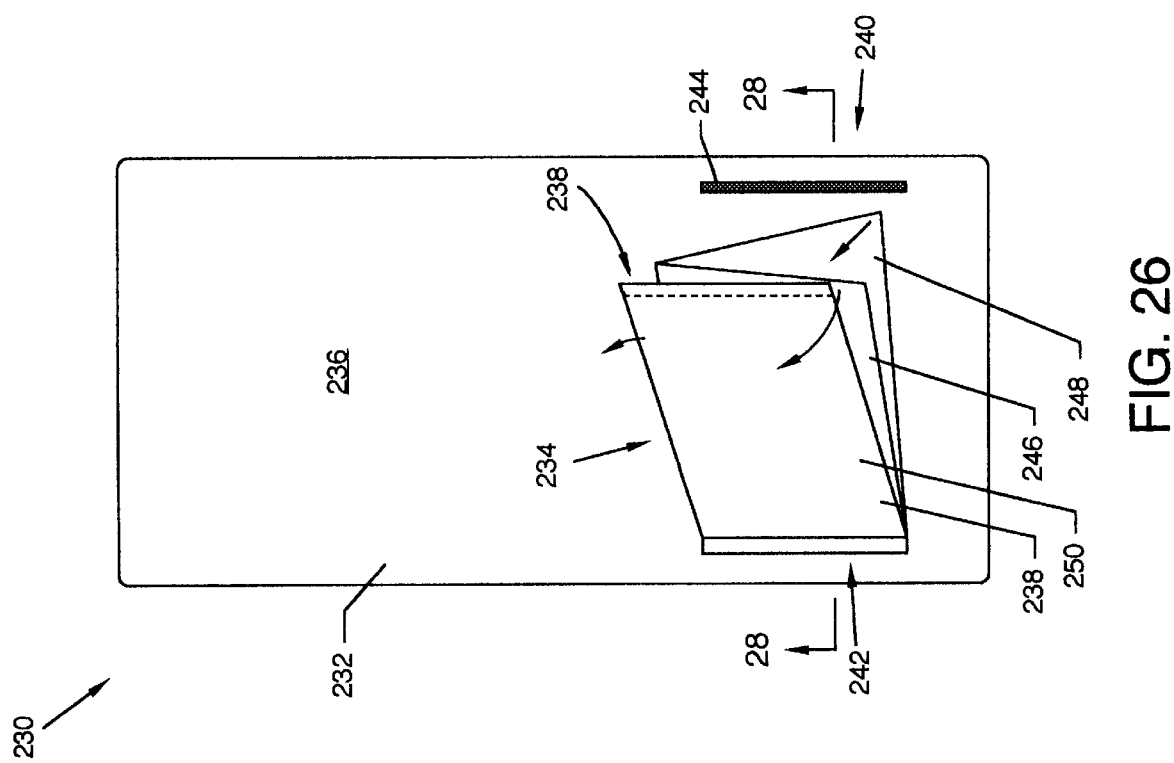
FIG. 26, a seventh alternative embodiment, illustrates a front view of a product information label system including the initial step of accessing information from a pamphlet.

FIG. 26, a seventh alternative embodiment, illustrates a front view of a product information label system 230, the present invention. The product information label system 230 includes a planar base member 232 of paper, plastic or other such suitable material which can have printed product information on its front surface 236, or which can be without printing, if desired. A pamphlet 234 is affixed to the front surface 236, as later described in detail. Pamphlet 234 is composed of multiple fold out informational printed paper panels covered by a transparent polypropylene plastic laminate 238 which is secured along left area 242 of the pamphlet 234 to the planar base member 232. The area 240 at the right side of the pamphlet 234 secures to the planar base member 232 by an ultraviolet cured release coating 244 which allows the user to easily disengage the right area 240 of the pamphlet 234 so that the printed matter on the multiple fold out informational panels may be viewed. Subsequent to pamphlet viewing, the user can reseal the right area 240 of the pamphlet 234 for future reference. The product information label system 230 can be attached, such as by adhesive, to a product, a product container or packaging material.

FIG. 26 also illustrates the initial step of accessing information from the pamphlet 234, where all numerals correspond to those elements previously described. The first step is to manually lift the polypropylene plastic laminate 238 from engagement at the right area 240 with the ultraviolet cured release coating 244, which is located on the planar base member 232, to expose informational planar paper panels 246 and 248, each having product information printed on one or more appropriate surfaces. Panels 246, 248 and 250 align to each other, whereby each panel is in direct contact with adjacent panels. Panel 250 is secured to the underside of the polypropylene plastic laminate 238, and the remaining panels 246 and 248 are free to be deployed, as depicted in FIG. 27, for informational browsing.

Figure 27:
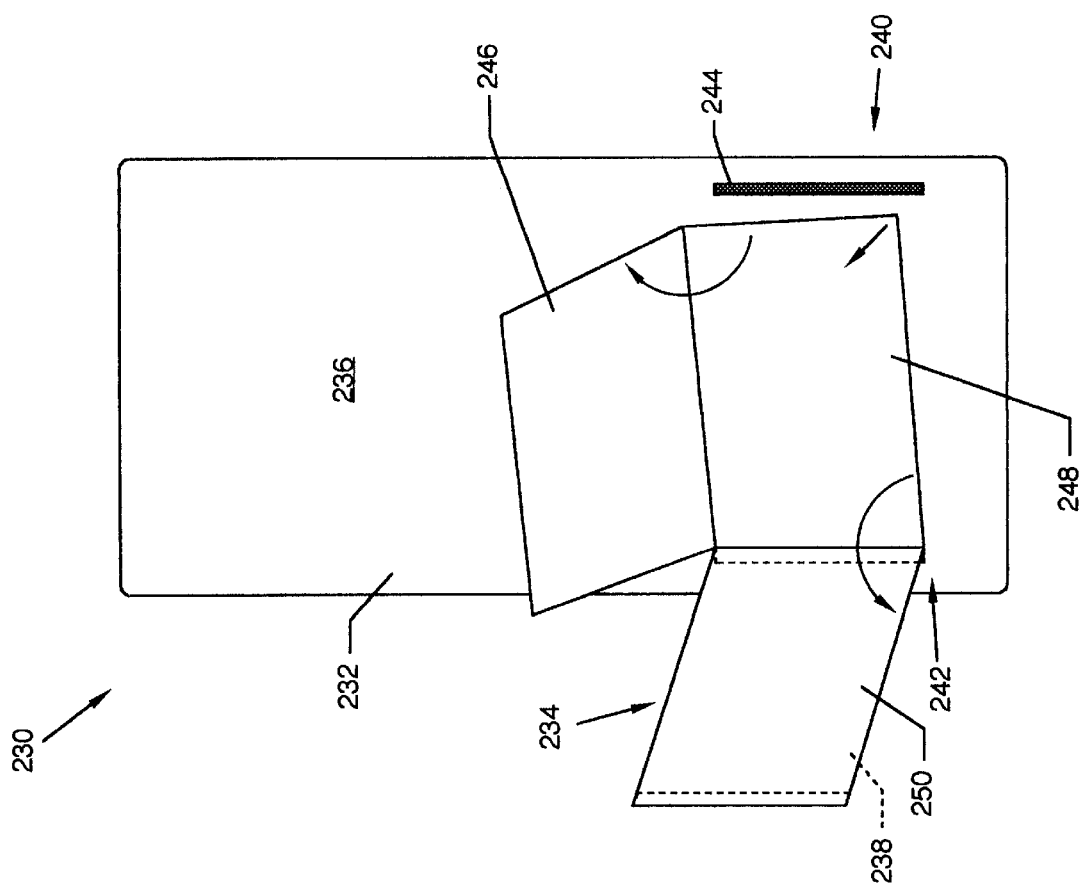
FIG. 27 illustrates the second step and full extension of the panels for accessing information from the pamphlet.

FIG. 27 illustrates the second step and full extension of the panels 246, 248 and 250 for accessing information from the pamphlet 234, where all numerals correspond to those elements previously described. As shown in this illustration, information is accessible on the front sides of panels 246 and 248, and the area on the planar base member 232 beneath panel 248. Of course, information is also accessible on the reverse sides of panels 246, 248 and 250 when the panels are rotated to the left about the left area 242. Also, information is viewable on the front side of panel 250 which is attached to the transparent polypropylene plastic laminate 238. Although three fold out panels 246, 248 and 250 are illustrated, any suitable number of panels, including accordion style panels, can be incorporated depending on the amount of informational material to be used.

Figure 28:
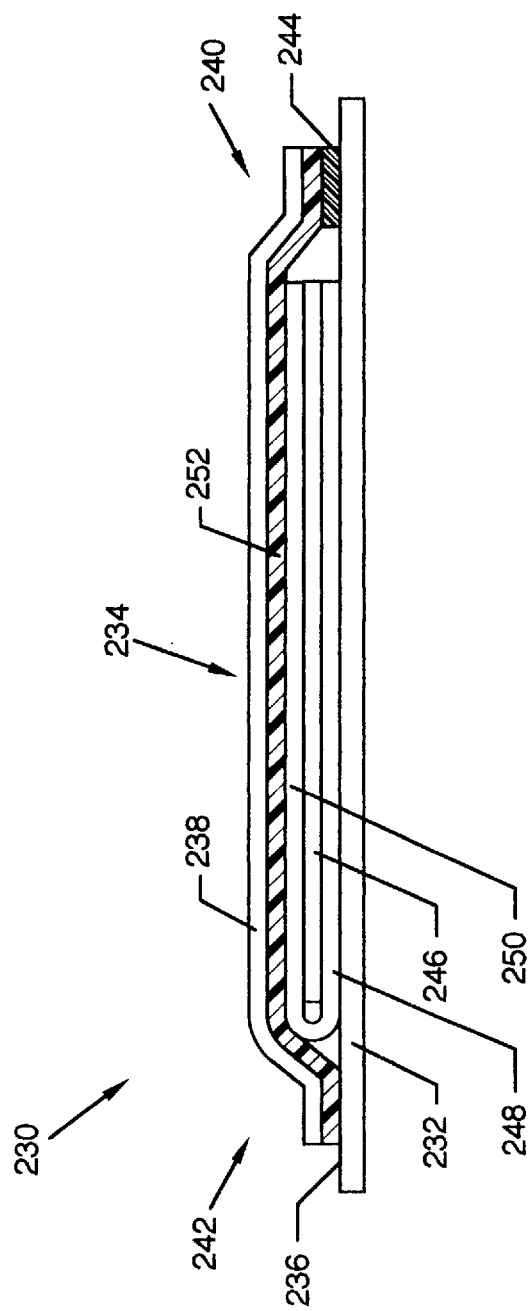
FIG. 28 illustrates a conceptual cross sectional view along line 28—28 of FIG. 26.

FIG. 28 illustrates a conceptual cross sectional view along line 28—28 of FIG. 26, where all numerals correspond to those previously described. Illustrated in particular is the method of attachment of the pamphlet members to the planar base member 232. A layer of acrylic pressure sensitive adhesive 252 is located on the inside surface of the polypropylene plastic laminate 238. The acrylic pressure sensitive adhesive layer 252 fastens the polypropylene plastic laminate 238 at left area 242 to the planar base member 232, secures the panel 250 to the polypropylene plastic laminate 238, and also contacts the ultraviolet cured release coating 244 located on the planar base member 232 at the right area 240 of the pamphlet 234 to seal the panels 246, 248 and 250 within the confines of the protective polypropylene plastic laminate 238. The left area 242 acts as a living hinge for folding out of the panels 246, 248 and 250, as well as revealing the area on the planar base member 232 beneath panel 248, for viewing. The use of the acrylic pressure sensitive adhesive layer 252 with the ultraviolet cured release coating 244 allows for excellent sealing and resealing characteristics, whereby the information can be accessed many times while still being able to reseal the pamphlet in a satisfactory manner.

Figure 29:
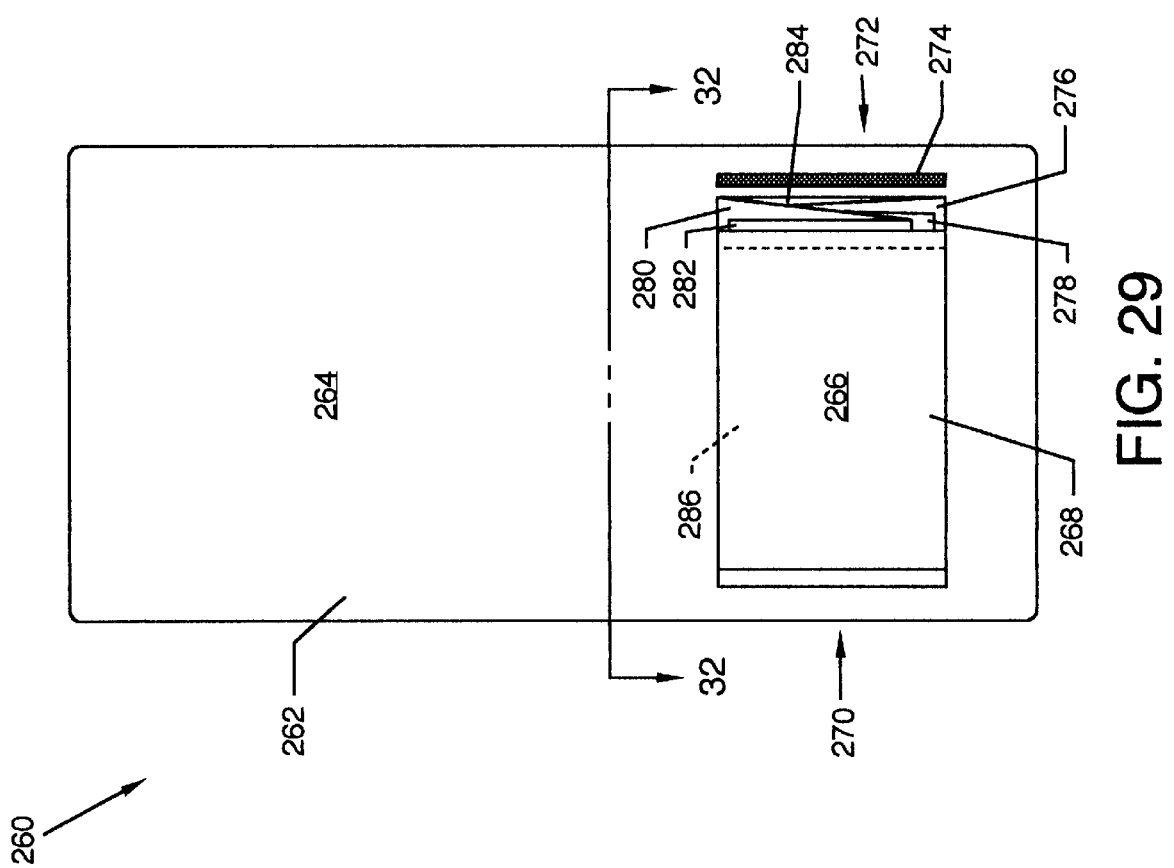
FIG. 29, an eighth alternative embodiment, illustrates a front view of a product information label system including the initial step of accessing information from a pamphlet.

FIG. 29, an eighth alternative embodiment, illustrates a front view of a product information label system 260, the present invention. The product information label system 260 includes a planar base member 262 of paper, plastic or other such suitable material which can have printed product information on its front surface 264, or which can be without printing, if desired. A pamphlet 266 is affixed to the front surface 264, as later described in detail. Pamphlet 266 is composed of multiple fold out informational printed paper panels covered by a transparent polypropylene plastic laminate 268 which is secured along left area 270 of the pamphlet 266 to the planar base member 262. The right area 272 of the pamphlet 266 secures to the planar base member 262 by an ultraviolet cured release coating 274 which allows the user to easily disengage the right area 272 of the pamphlet 266 so that the printed matter on the multiple fold out informational panels may be viewed. Subsequent to pamphlet viewing, the user can reseal the right area 272 of the pamphlet 266 for future reference. The product information label system 260 can be attached, such as by adhesive, to a product, a product container or packaging material.

FIG. 29 also illustrates the initial step of accessing information from the pamphlet 266, where all numerals correspond to those elements previously described. The first step is to manually lift the polypropylene plastic laminate 268 from engagement at the right area 272 with the ultraviolet cured release coating 274, which is located on the planar base member 262, to expose informational planar paper panels 276, 278, 280, 282 and 284, each having product information printed on one or more appropriate surfaces. Panel 286 is secured to the underside of the polypropylene plastic laminate 268, and the remaining panels 276, 278, 280 and 282, as well as panels 284 and 286, are free to be deployed, as depicted in FIG. 30 and FIG. 31, for informational browsing.

Figure 30:
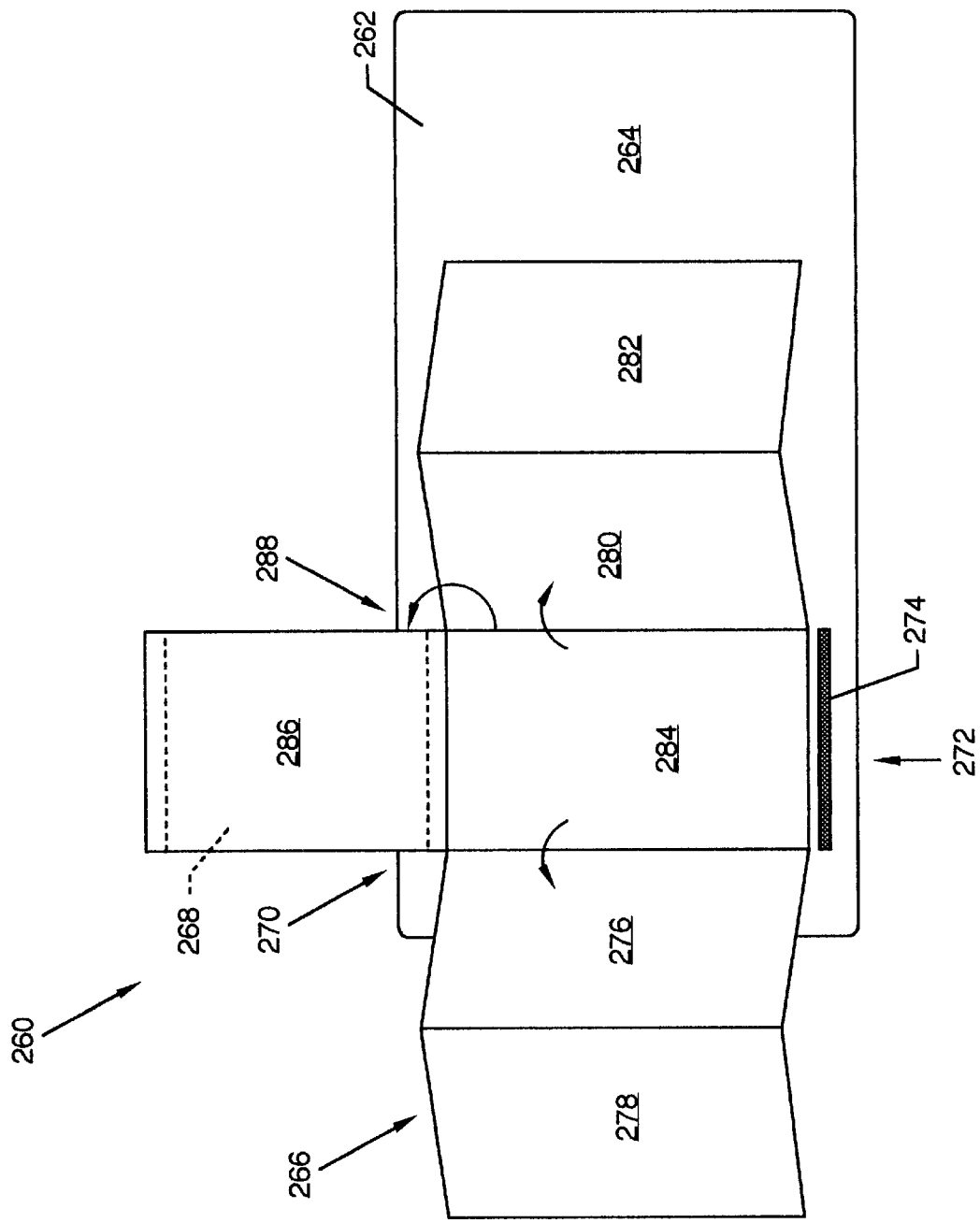
FIG. 30 illustrates the second step and full extension of the panels for accessing information from the pamphlet.

FIG. 30 illustrates the second step and full extension of the panels 276, 278, 280, 282 and 286 for accessing information from the pamphlet 266, where all numerals correspond to those elements previously described. The product information label system 260 is rotated 90° from the view of FIG. 29 for illustration purposes. Panels 276 and 278 extend from the center panel 284 in accordion fold style and panels 280 and 282 also extend in accordion fold style from the center panel 284. Panel 286 folds about a living hinge 288 at the left area 270. As shown in this illustration, information is accessible on the front sides of panels 276, 278, 280, 282 and 284. Of course, information is also accessible on the reverse sides of panels 276, 278, 280, 282, 284 and 286 when the panels are rotated to the left about the left area 270, as illustrated in FIG. 31. Also, information is viewable on the front side of panel 286 which is attached to the transparent polypropylene plastic laminate 268 and on the area on the planar base member 262 beneath panel 284. Any suitable number of accordion style panels can be incorporated depending on the amount of informational material to be used.

Figure 31:
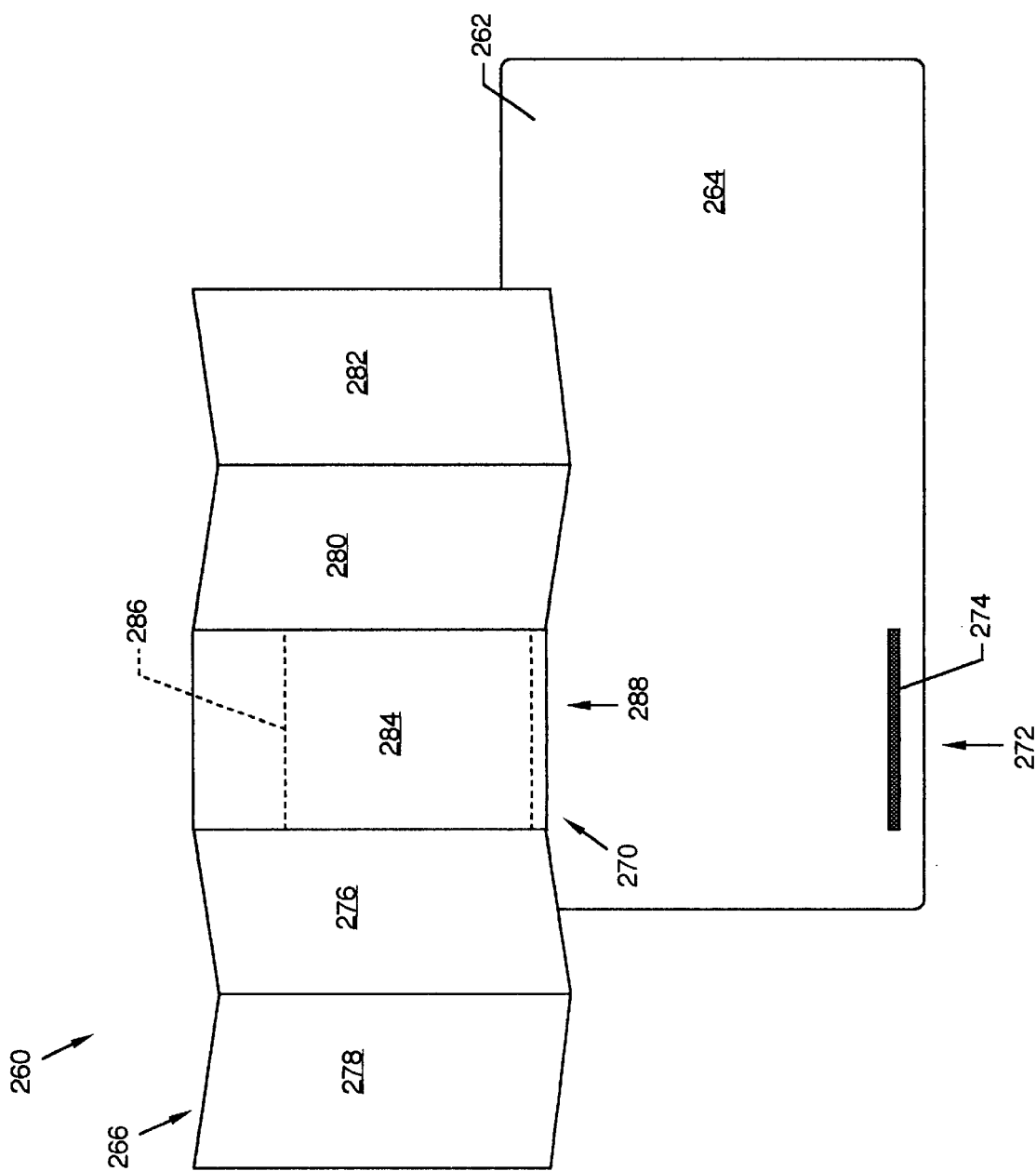
FIG. 31 illustrates panels rotated about a living hinge to reveal the reverse sides of the panels.

FIG. 31 illustrates panels 276, 278, 280, 282, 284 and 286 rotated about the living hinge 288 at the left area 270 to reveal the reverse sides of the panels 276, 278, 280, 282 and 284, where all numerals correspond to those elements previously described.

Figure 32:
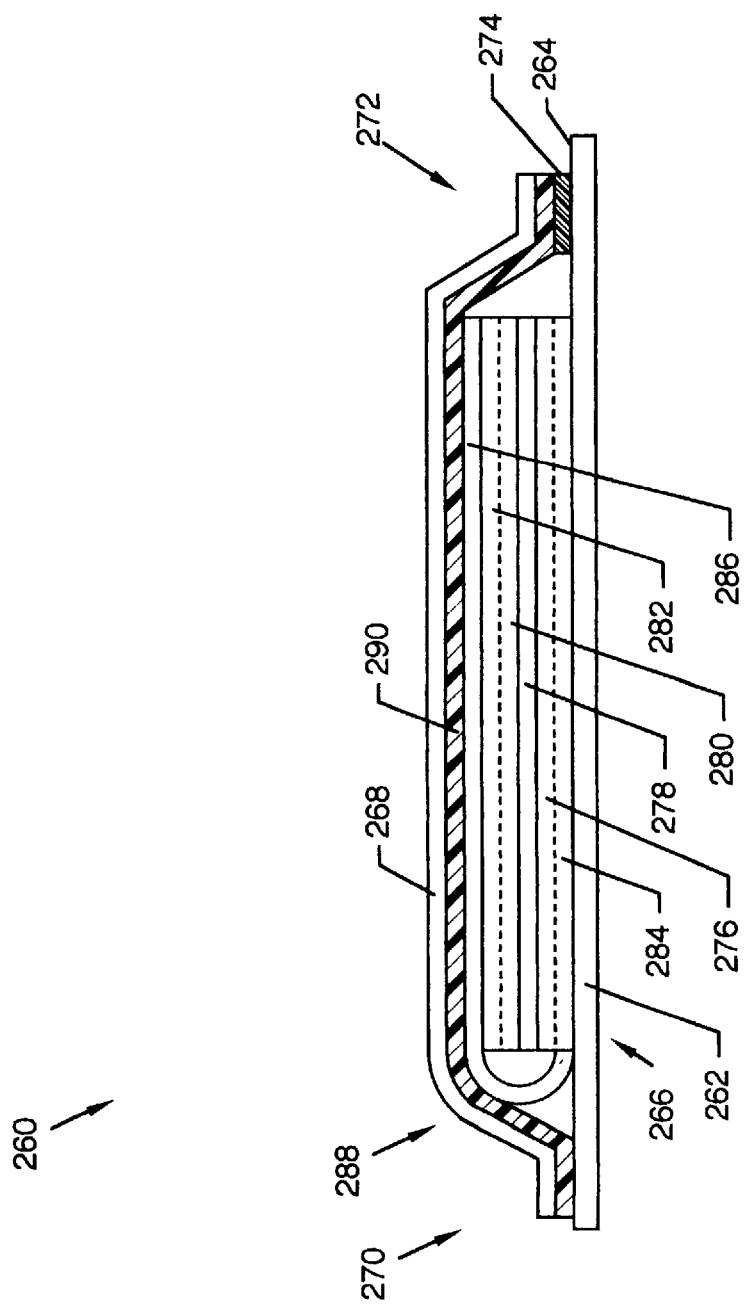
FIG. 32 illustrates a conceptual cross sectional view along line 32—32 of FIG. 29.

FIG. 32 illustrates a conceptual cross sectional view along line 32—32 of FIG. 29, where all numerals correspond to those previously described. Illustrated in particular is the method of attachment of the pamphlet members to the planar base member 262. A layer of acrylic pressure sensitive adhesive 290 is located on the inside surface of the polypropylene plastic laminate 268. The acrylic pressure sensitive adhesive layer 290 fastens the polypropylene plastic laminate 268 at the left area 270 to the planar base member 262, secures the panel 286 to the polypropylene plastic laminate 268, and also contacts the ultraviolet cured release coating 274 located on the planar base member 262 at the right area 272 of the pamphlet 266 to seal the panels 276, 278, 280, 282, 284 and 286 within the confines of the protective polypropylene plastic laminate 268. The left area 270 acts as a living hinge 288 for folding out of the panels 276, 278, 280, 282, 284 and 286, as well as the area on the planar base member 262 beneath panel 284, for viewing. The use of the acrylic pressure sensitive adhesive layer 290 with the ultraviolet cured release coating 274 allows for excellent sealing and resealing characteristics, whereby the information can be accessed many times while still being able to reseal the pamphlet in a satisfactory manner.

Figure 33:
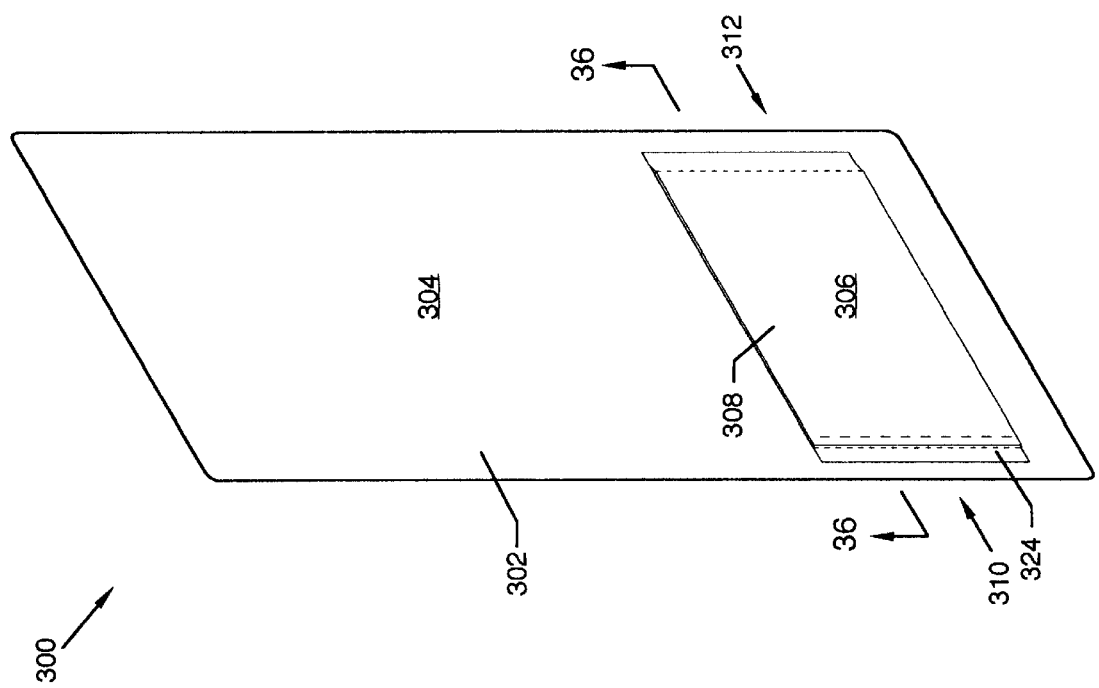
FIG. 33, a ninth alternative embodiment, illustrates an isometric view of a product information label system.

FIG. 33, a ninth alternative embodiment, illustrates an isometric view of a product information label system 300, the present invention. The product information label system 300 includes a planar base member 302 of paper, plastic or other such suitable material which can have printed product information on its front surface 304, or which can be without printing, if desired. A pamphlet 306 is affixed to the front surface 304, as later described in detail. Pamphlet 306 is composed of multiple informational printed paper panels in bound booklet form covered by a transparent polypropylene plastic laminate 308 which is secured along a left area 310 of the pamphlet 306 to the planar base member 302. The area 312 at the right side of the pamphlet 306 secures to the planar base member 302 by an ultraviolet cured release coating 314 which allows the user to easily disengage the right area 312 of the pamphlet 306 so that the printed matter on the multiple informational panels, in booklet form, may be viewed. Subsequent to pamphlet viewing, the user can reseal the right area 312 of the pamphlet 306 for future reference. The product information label system 300 can be attached, such as by adhesive, to a product or product container or packaging material.

Figure 34:
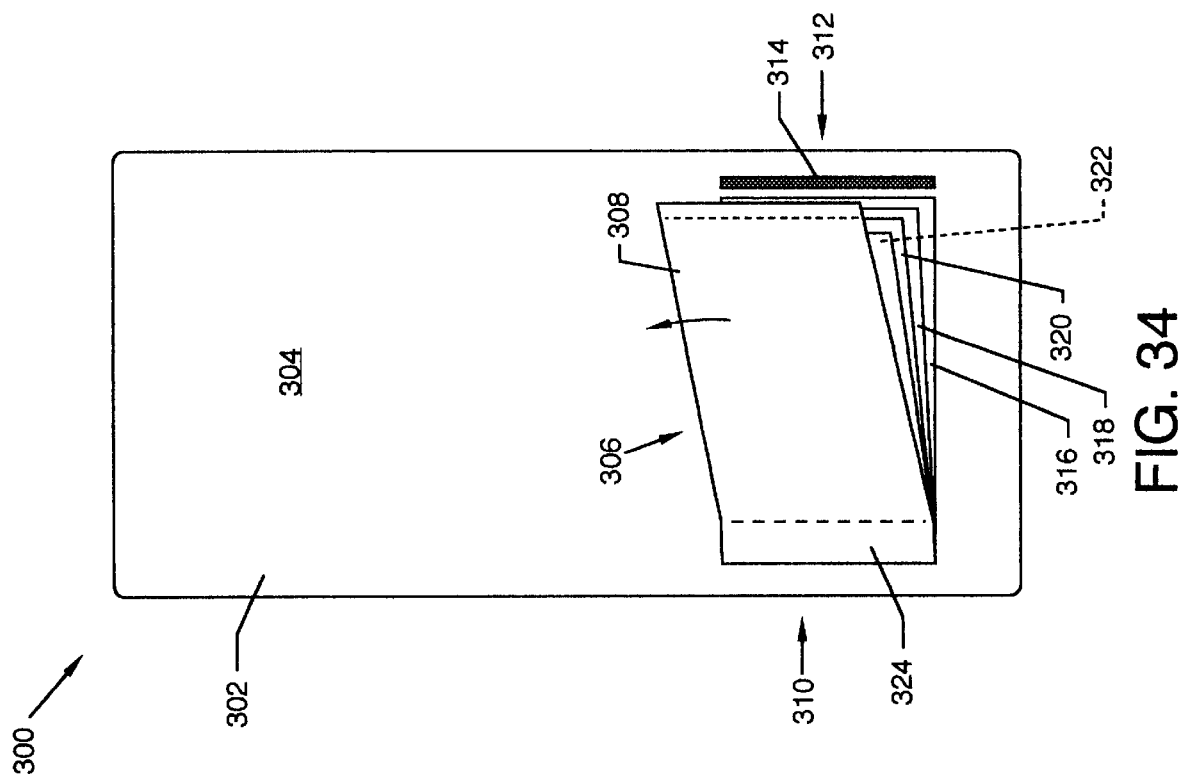
FIG. 34 illustrates a front view of the product information label system of FIG. 33 including the initial step of accessing information from a pamphlet.

FIG. 34 illustrates a front view of the product information label system 300 including the initial step of accessing information from the pamphlet 306. The first step is to manually lift the polypropylene plastic laminate 308 from engagement at the right area 312 with an ultraviolet cured release coating 314, which is located on the planar base member 302, to expose informational planar paper panels 316, 318, 320 and 322, each having product information printed on one or more appropriate surfaces. Panels 316, 318, 320 and 322 align in stacked style where one panel, or more, is aligned with other panels. Panel 322 is secured to the underside of the polypropylene plastic laminate 308, and the remaining panels 316, 318 and 320 are free to be deployed, as depicted in FIG. 35, for informational browsing.

Figure 35:
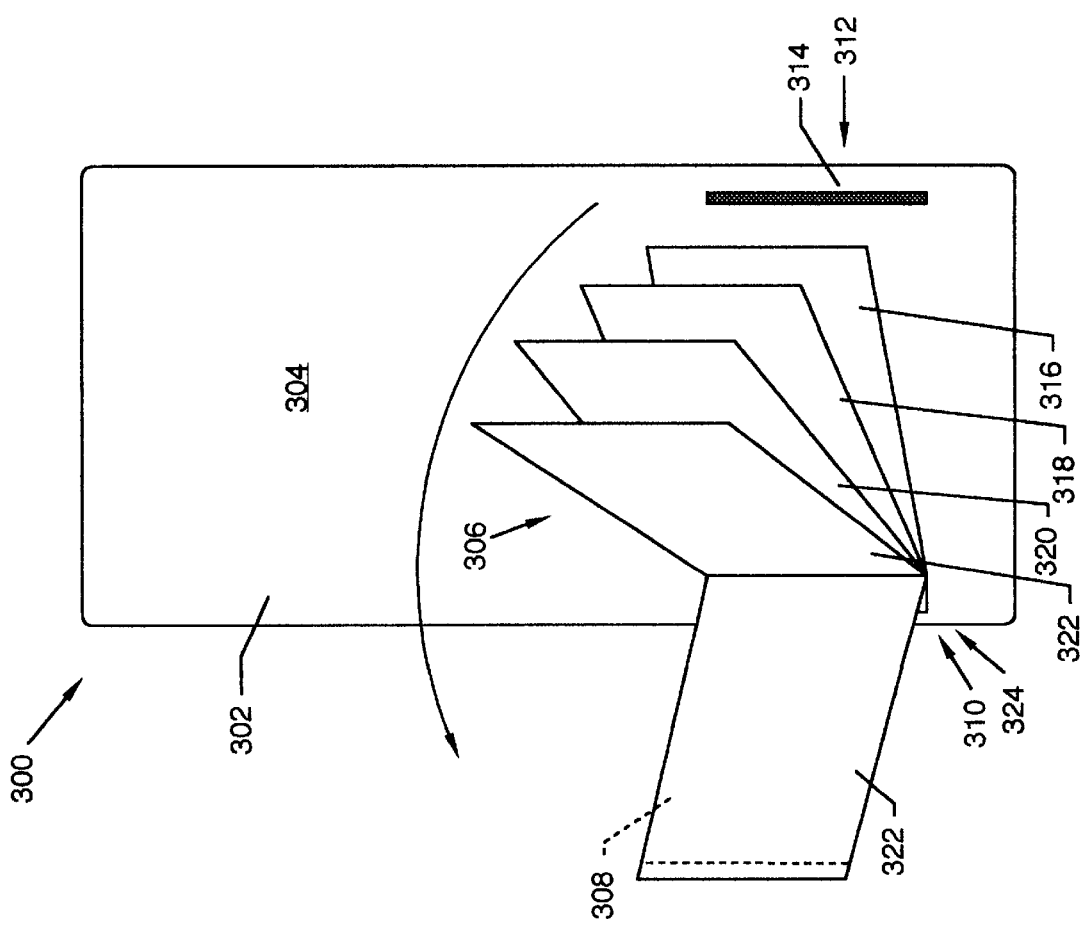
FIG. 35 illustrates the second step and full extension of the panels for accessing information from the pamphlet.

FIG. 35 illustrates the second step and full extension of the panels 316, 318, 320 and 322 for accessing information from the pamphlet 306, where all numerals correspond to those elements previously described. As shown in this illustration, information is accessible on the front sides of panels 316, 318 and 320, the back side of panel 322, and in the area on the planar base member 302 beneath panel 316. Of course, information is also accessible on the back sides of panels 316, 318 and 320 when the panels are rotated to the left about the living hinge 324 at the left area 310. Information is viewable on both sides of panel 322 which is attached to the transparent polypropylene plastic laminate 308. Although three stacked panels 316, 318 and 320 are illustrated, any suitable number of panels can be incorporated depending on the amount of informational material to be incorporated.

Figure 36:
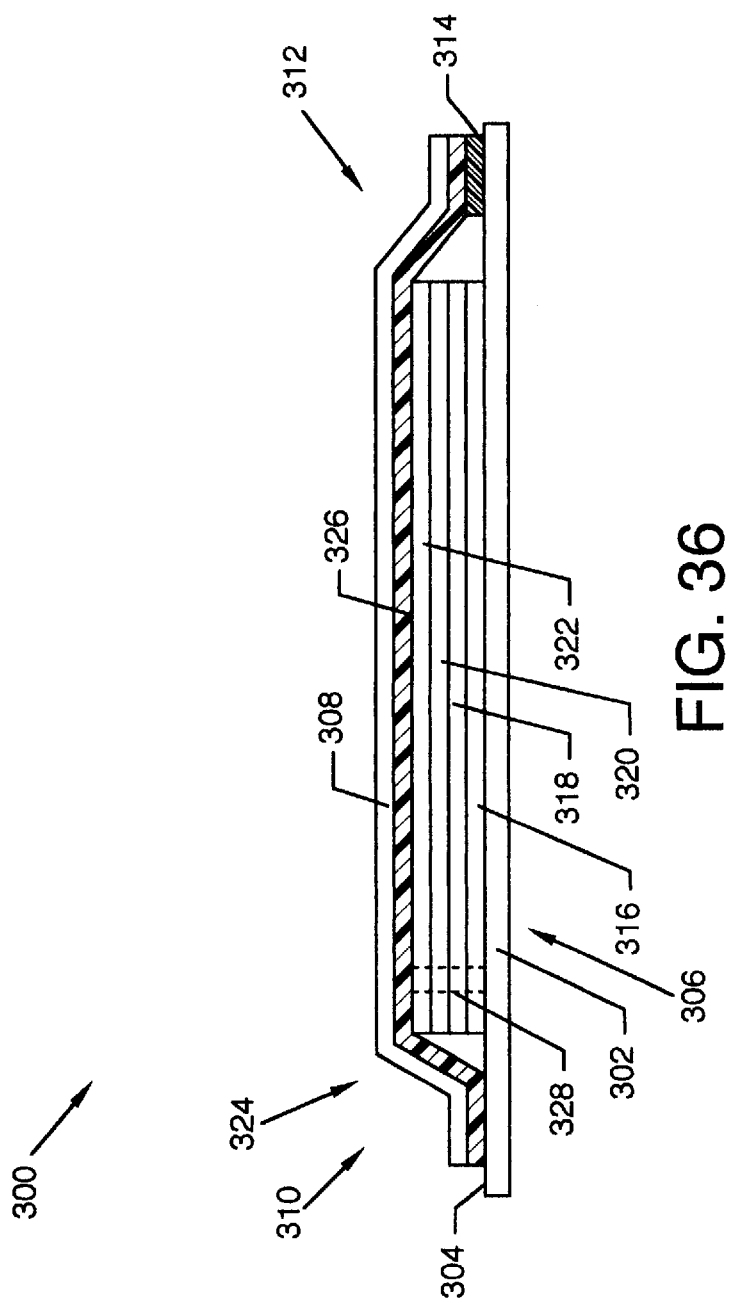
FIG. 36 illustrates a conceptual cross sectional view along line 36—36 of FIG. 33.

FIG. 36 illustrates a conceptual cross sectional view of the product information label system 300 along line 36—36 of FIG. 33, where all numerals correspond to those previously described. Illustrated in particular is the method of attachment of the pamphlet members to the planar base member 302. A layer of acrylic pressure sensitive adhesive 326 is located on the inside surface of the polypropylene plastic laminate 308. The acrylic pressure sensitive adhesive layer 326 fastens the polypropylene plastic laminate 308 at the left area 310 to the planar base member 302, secures the panel 322 directly and panels 316, 318 and 320 indirectly to the polypropylene plastic laminate 308, and also contacts the ultraviolet cured release coating 314 located on the planar base member 302 at the right area 312 of the pamphlet 306 to seal the panels 316, 318, 320 and 322 within the confines of the protective polypropylene plastic laminate 308. Panels 316, 318, 320 and 322 are mutually secured by a suitable securing member 328 such as, but not limited to, staples, rivets, gluing, stitching and the like. The left area 310 acts as a living hinge 324 for folding out, as a unit, of the panels 316, 318, 320 and 322 for subsequent individual viewing of both sides of the panels 316, 318, 320 and 322. The use of the acrylic pressure sensitive adhesive layer 326 with the ultraviolet cured release coating 314 allows for excellent sealing and resealing characteristics, whereby the information can be accessed many times while still being able to reseal the pamphlet in a satisfactory manner.

Figure 37:
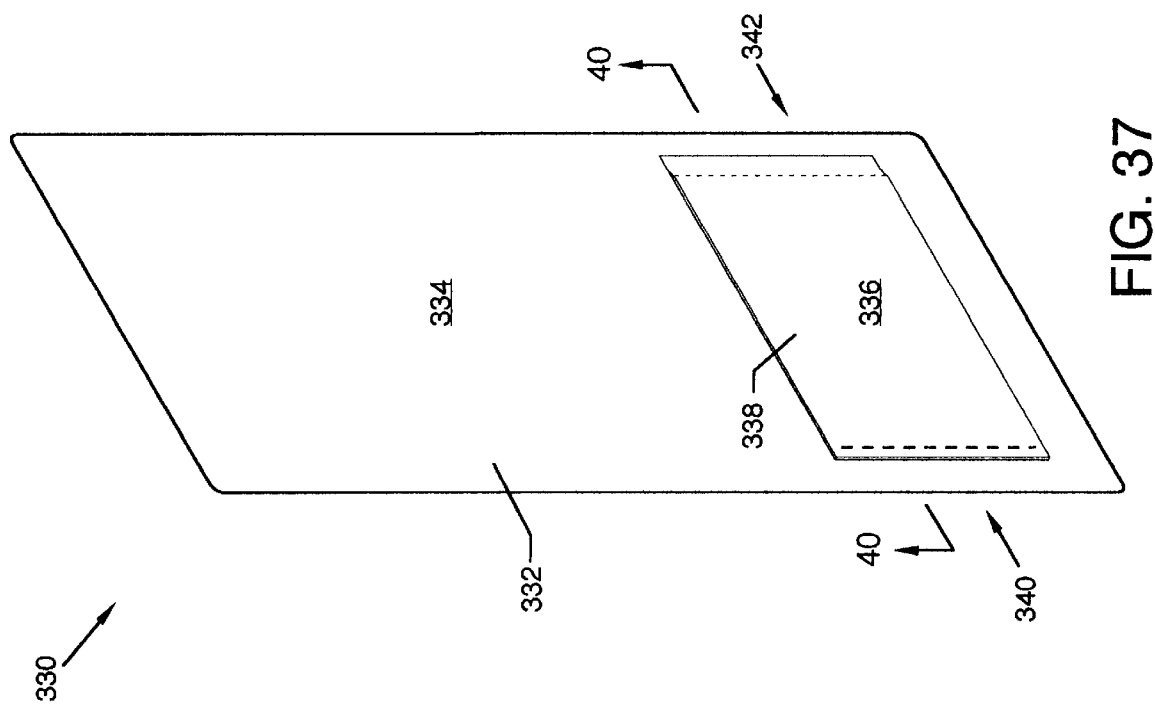
FIG. 37, a tenth alternative embodiment, illustrates an isometric view of a product information label system.

FIG. 37, a tenth alternative embodiment, illustrates an isometric view of a product information label system 330, the present invention. The product information label system 330 includes a planar base member 332 of paper, plastic or other such suitable material which can have printed product information on its front surface 334, or which can be without printing, if desired. A pamphlet 336 is affixed to the front surface 334, as later described in detail. Pamphlet 336 is composed of multiple informational printed paper panels in bound booklet form having a top pamphlet member 338. The top pamphlet member 338, and pamphlet members beneath the pamphlet top member 338, are secured along a left area 340 of the pamphlet 336 to the planar base member 332. The right area 342 of the pamphlet 336 secures to the planar base member 332 by an ultraviolet cured release coating 344 which allows the user to easily disengage the right area 342 of the pamphlet 336 so that the printed matter on the multiple informational panels, in booklet form, may be viewed. Subsequent to pamphlet viewing, the user can reseal the right area 342 of the pamphlet 336 for future reference. The product information label system 330 can be attached, such as by adhesive, to a product or product container or packaging material.

Figure 38:
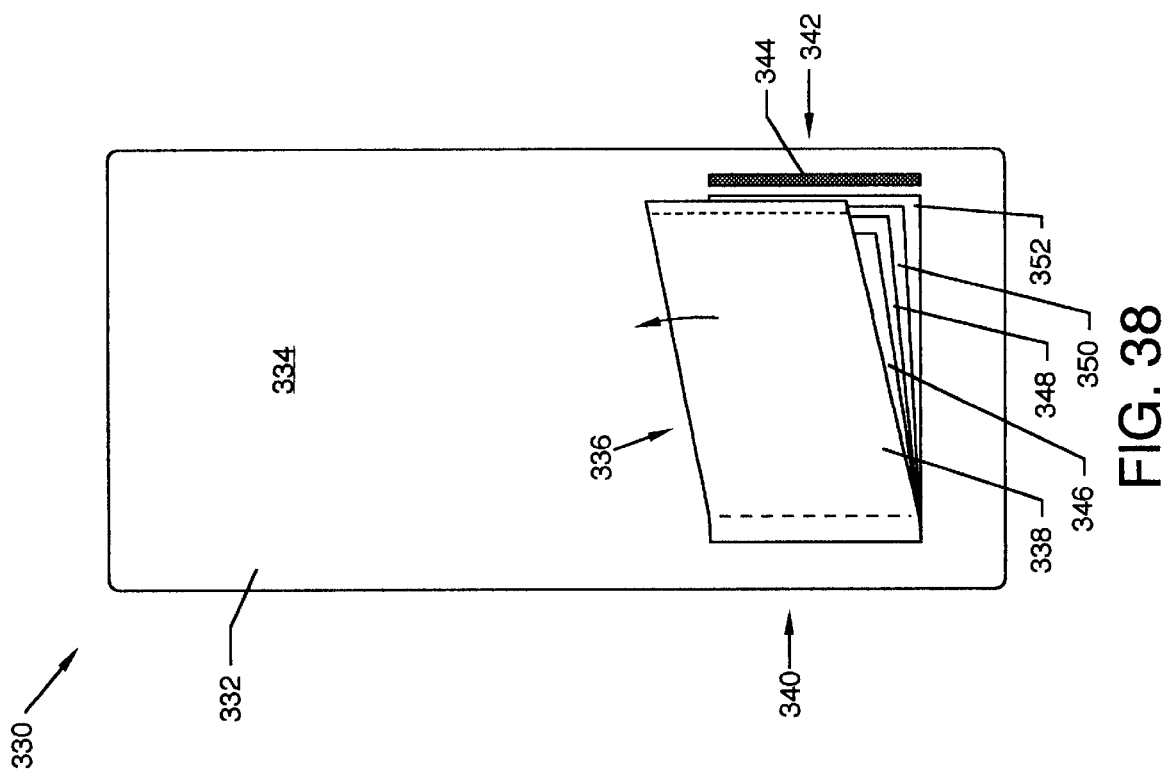
FIG. 38 illustrates a front view of the product information label system of FIG. 37 including the initial step of accessing information from a pamphlet.

FIG. 38 illustrates a front view of the product information label system 330 including the initial step of accessing information from the pamphlet 336, where all numerals correspond to those elements previously described. The first step is to manually lift the top pamphlet member 338 from engagement at the right area 342 with the ultraviolet cured release coating 344, which is located on the planar base member 332, to expose informational planar paper panels 346, 348, 350 and 352, each having product information printed on one or more appropriate surfaces. Panels 338, 346, 348, 350 and 352 align in stacked style where one panel, or more, is aligned with adjacent panels. Panels 338, 346, 348 350 and 352 are free to be deployed, as depicted in FIG. 39, for informational browsing.

Figure 39:
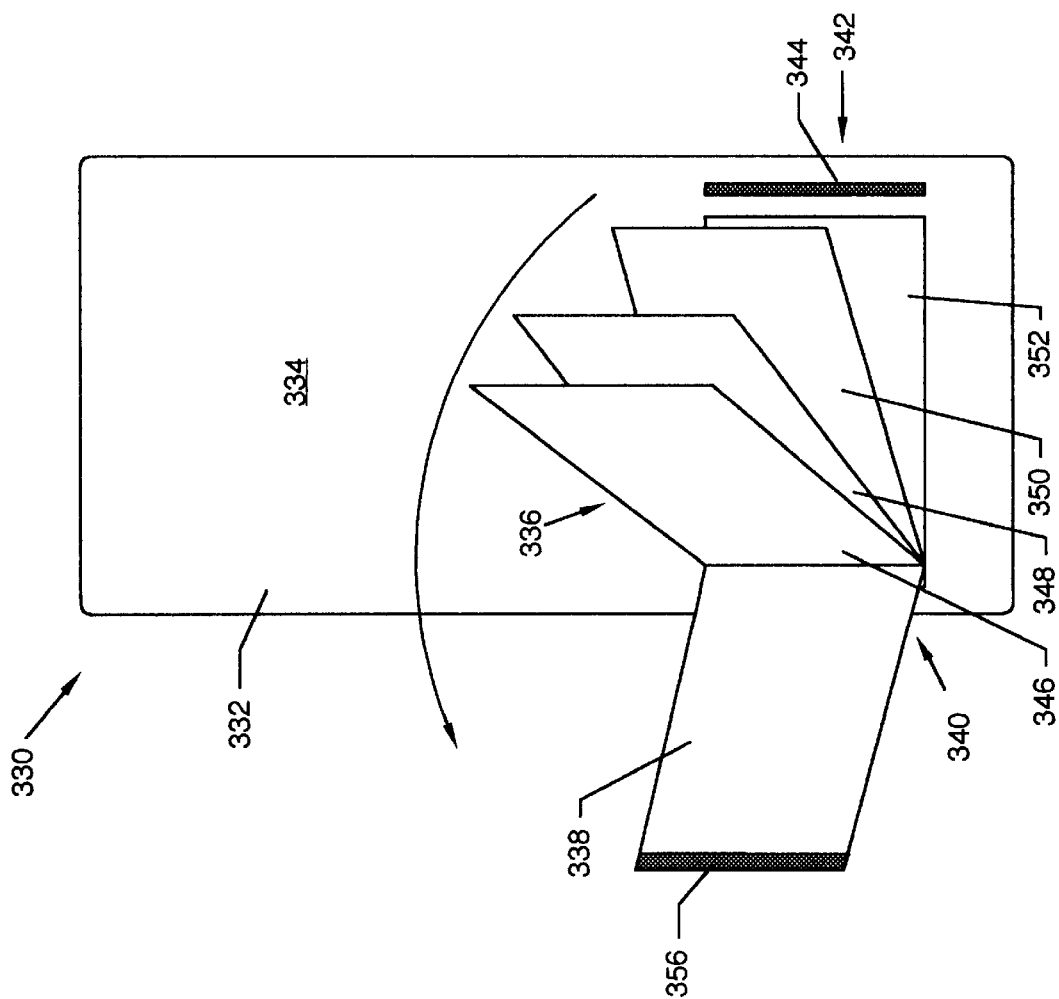
FIG. 39 illustrates the second step and full extension of the panels for accessing information from the pamphlet; and, FIG. 40 illustrates a conceptual cross sectional view along line 40—40 of FIG. 37.

FIG. 39 illustrates the second step and full extension of the panels 338, 346, 348, 350 and 352 for accessing information from the pamphlet 336, where all numerals correspond to those elements previously described. As shown in this illustration, information is accessible on the front sides of panels 346, 348, 350 and 352, and the back side of panel 338. Of course, information is also accessible on the back sides of panels 346, 348, 350 and 352 when the panels are rotated to the left about the left area 340. Information is viewable on both sides of panel 338. Although five stacked panels 338, 346, 348, 350 and 352 are illustrated, any suitable number of panels can be incorporated depending on the amount of informational material to be incorporated.

Figure 40:
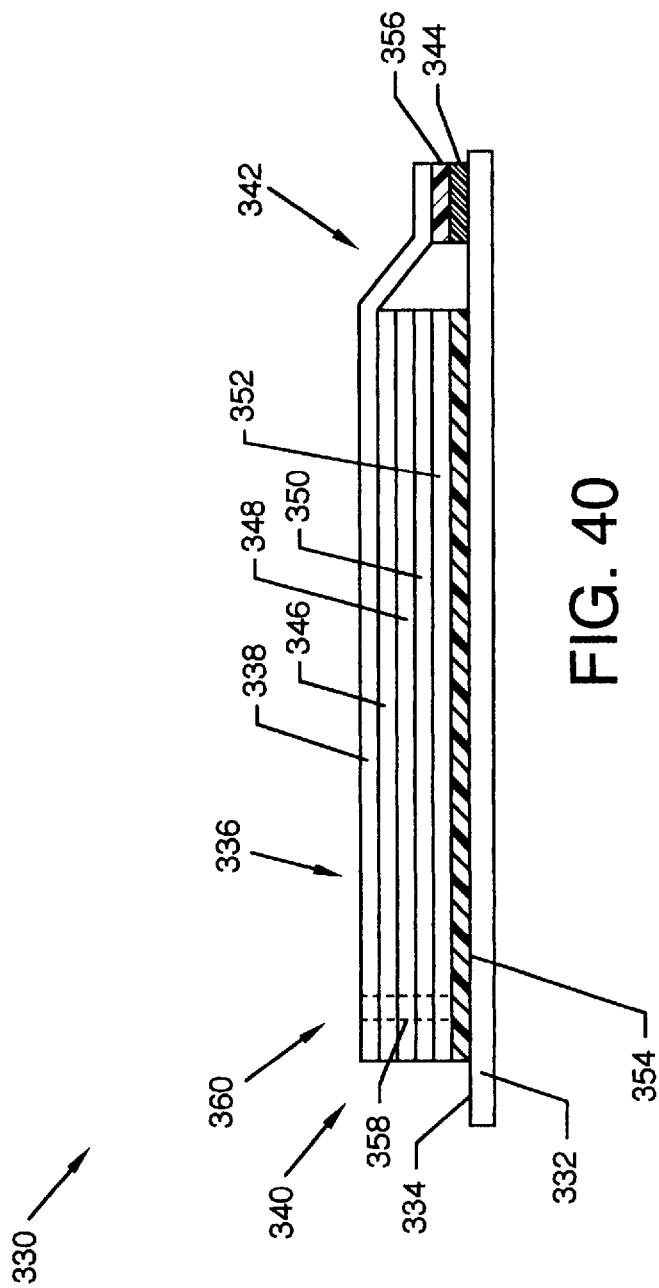

FIG. 40 illustrates a conceptual cross sectional view along line 40—40 of FIG. 37 of the product information label system 330, where all numerals correspond to those previously described. Illustrated in particular is the method of attachment of the pamphlet members to the planar base member 332. A layer of hot melt adhesive 354 is located on the front surface 334 of the planar base member 332. The hot melt adhesive 354 fastens the bottom panel 352 directly to the planar base member 332, and panels 338, 346, 348, 350 and 352 indirectly to the planar base member 332. A strip of hot melt adhesive 356 is located on the underside edge of the top pamphlet member 338 at the right area 342 which contacts the ultraviolet cured release coating 344 located on the planar base member 332 to seal the panels 346, 348, 350 and 352 within the confines of the top pamphlet member 338. Panels 338, 346, 348, 350 and 352 are mutually secured by a suitable securing member 358 such as, but not limited to, staples, rivets, gluing, stitching and the like. The left area 340 acts as a living hinge 360 for folding out, as a unit, of the panels 338, 346, 348, 350 and 352 for subsequent individual viewing of both sides of the panels 338, 346, 348, 350 and 352. The use of hot melt adhesive strip 356 with the ultraviolet cured release coating 344 allows for excellent sealing and resealing characteristics, whereby the information can be accessed many times while still being able to reseal the pamphlet in a satisfactory manner.

Various modifications can be made to the present invention without departing from the apparent scope hereof.

We claim:

1. A product information label system comprising:
   a. a planar base member having upper and lower surfaces, said lower surface being fixable to a product, a product container, or a product package;
   b. a transparent plastic laminate having upper and lower surfaces, said lower surface having a layer of pressure sensitive adhesive thereon;
   c. a pamphlet composed of multiple fold out panels formed from a single piece of material, each panel having printed information on one or both sides thereof, one of said multiple fold out panels defining a bottom panel, another of said multiple fold out panels defining a cover panel and being adhesively attached to said layer of pressure sensitive adhesive on said lower surface of said transparent plastic laminate, and the others of said multiple fold out panels being folded and positioned between said bottom panel and said cover panel;
   d. a first edge of said transparent plastic laminate extending beyond said pamphlet in a first direction and being adhesively attached to said upper surface of said planar base member by said pressure sensitive adhesive on said lower surface of said transparent plastic laminate to thereby form a living hinge;
   e. said planar base member having a first strip of ultraviolet cured release coating material on its said upper surface adjacent to an edge thereof;
   f. a second edge of said transparent plastic laminate extending beyond said pamphlet in a second direction and being releasably attached to a second strip of ultraviolet cured release coating material, located adjacent said second edge, has by said pressure sensitive adhesive on said lower surface of said transparent plastic laminate; and,
   g. said product information system further being characterized by the complete absence of any adhesive of any kind between said bottom panel of said pamphlet and said planar base member; such that,
      said pressure sensitive adhesive on said lower surface of said transparent plastic laminate can be released from said strip of ultraviolet cured release coating material on said upper surface of said planar base member to permit said transparent plastic laminate to be opened about said living hinge to thereby gain access to both sides of all of said fold out panels of said pamphlet for browsing of said printed information thereon.

2. A product information label system comprising:

a. a planar base member having upper and lower surfaces, said lower surface being fixable to a product, a product container, or a product package, and said upper surface having a strip of ultraviolet cured release coating material thereon adjacent to an edge thereof;

b. a pamphlet composed of multiple fold out panels formed from a single piece of material, each panel having printed information on one or both sides thereof, one of said multiple fold out panels defining a bottom panel, another of said multiple fold out panels defining a cover panel, and the others of said multiple fold out panels being folded and positioned between said bottom panel and said cover panel;

c. said bottom panel of said pamphlet being permanently secured to said upper surface of said planar base member by an adhesive; and, d. said cover panel of said pamphlet having an edge extending beyond said bottom panel and beyond all of said panels between said bottom panel and said cover panel to a position overlying said strip of ultraviolet cured release coating material on said upper surface of said planar base member, said edge of said cover panel having a layer of hot melt adhesive thereon contacting said strip of ultraviolet cured release coating material on said upper surface of said planar base member; such that, said pamphlet can be opened to allow browsing of said printed information on said panels by releasing said hot melt adhesive layer on said cover panel from said strip of ultraviolet cured release coating material on said upper surface of said planar base member and folding out said panels.

* * * * *

UNITED STATES PATENT AND TRADEMARK OFFICE
CERTIFICATE OF CORRECTION

PATENT NO. : 5,866,219
DATED : February 2, 1999
INVENTOR(S) : McClure et al.

It is certified that error appears in the above-identified patent and that said Letters Patent is hereby corrected as shown below:

<u>Column 16,</u>
Line 27, amend claim 1 to read as follows:
1. A product information label system comprising;
a. a planar base member having upper and lower surfaces, said lower surface being fixable to a product, a product container, or a product package;
b. a transparent plastic laminate having upper and lower surfaces, said lower surface having a layer of pressure sensitive adhesive thereon;
c. a pamphlet composed of multiple fold out panels formed from a single piece of material, each panel having printed information on one or both sides thereof, one of said multiple fold out panels defining a bottom panel, another of said multiple fold out panels defining a cover panel and being adhesively attached to said layer of pressure sensitive adhesive on said lower surface of said transparent plastic laminate, and the others of said multiple fold out panels being folded and positioned between said bottom panel and said cover panel;
d. a first edge of said transparent plastic laminate extending beyond said pamphlet in a first direction and being adhesively attached to said upper surface of said planar base member by said pressure sensitive adhesive on said lower surface of said transparent plastic laminate to thereby form a living hinge;
e. said planar base member having a strip of ultraviolet cured release coating material on its said upper surface adjacent to an edge thereof;
f. a second edge of said transparent plastic laminate extending beyond said pamphlet in a second direction and being releasably attached to said strip of ultraviolet cured release coating material by said pressure sensitive adhesive on said lower surface of said transparent plastic laminate; and,

UNITED STATES PATENT AND TRADEMARK OFFICE
CERTIFICATE OF CORRECTION

PATENT NO. : 5,866,219
DATED : February 2, 1999
INVENTOR(S) : McClure et al.

It is certified that error appears in the above-identified patent and that said Letters Patent is hereby corrected as shown below:

Column 16 (cont'd), g. said product information system further being characterized by the complete absence of any adhesive of any kind between said bottom panel of said pamphlet and said planar base member; such that,
    said pressure sensitive adhesive on said lower surface of said transparent plastic laminate can be released from said strip of ultraviolet cured release coating material on said upper surface of said planar base member to permit said transparent plastic laminate to be opened about said living hinge to thereby gain access to both sides of all of said fold out panels of said pamphlet for browsing of said printed information thereon.

Signed and Sealed this

Twenty-first Day of December, 2004

JON W. DUDAS
*Director of the United States Patent and Trademark Office*